(12) United States Patent
Zhang et al.

(10) Patent No.: US 10,506,574 B2
(45) Date of Patent: Dec. 10, 2019

(54) SUPPORT OF TRANSMISSION MODE AND IMPACT ON PDCCH BLIND DECODES OF PTM (POINT-TO-MULTIPOINT) TRANSMISSION

(71) Applicant: QUALCOMM Incorporated, San Diego, CA (US)

(72) Inventors: Xiaoxia Zhang, San Diego, CA (US); Peter Gaal, San Diego, CA (US); Jun Wang, Poway, CA (US); Xipeng Zhu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 15/537,376

(22) PCT Filed: Jan. 22, 2016

(86) PCT No.: PCT/CN2016/071757
§ 371 (c)(1),
(2) Date: Jun. 16, 2017

(87) PCT Pub. No.: WO2016/119640
PCT Pub. Date: Aug. 4, 2016

(65) Prior Publication Data
US 2017/0347341 A1 Nov. 30, 2017

(30) Foreign Application Priority Data
Jan. 30, 2015 (WO) ............... PCT/CN2015/071911

(51) Int. Cl.
*H04L 1/16* (2006.01)
*H04W 4/06* (2009.01)
(Continued)

(52) U.S. Cl.
CPC .......... *H04W 72/042* (2013.01); *H04B 7/024* (2013.01); *H04B 7/0689* (2013.01);
(Continued)

(58) Field of Classification Search
CPC ........... H04W 72/042; H04W 72/0446; H04W 72/06; H04W 72/004; H04W 88/02;
(Continued)

(56) References Cited

U.S. PATENT DOCUMENTS

2004/0229624 A1* 11/2004 Cai ................. H04L 1/1657
455/449
2008/0311926 A1* 12/2008 Fischer ............... H04W 72/005
455/452.1
(Continued)

FOREIGN PATENT DOCUMENTS

| CA | 2890712 A1 | 5/2014 |
|---|---|---|
| CN | 1627725 A | 6/2005 |

(Continued)

OTHER PUBLICATIONS

Supplementary European Search Report—EP16742702—Search Authority—Munich—dated Aug. 3, 2018.
(Continued)

*Primary Examiner* — Melvin C Marcelo
(74) *Attorney, Agent, or Firm* — Arent Fox, LLP

(57) ABSTRACT

Various improvements are desired for point-to-multipoint (PTM) transmission, where a network sends the PTM transmission to multiple user equipments (UEs). The apparatus may be an UE. The UE receives, from a network, a downlink transmission configuration indicating a transmit diversity downlink transmission mode of a plurality of downlink transmission modes, configures downlink communication based on the transmit diversity downlink transmission mode according to the downlink transmission configuration, and
(Continued)

receives a service via PTM downlink transmission based on the transmit diversity transmission mode. In another aspect, The UE receives, from a network, a downlink transmission configuration indicating one of a plurality of downlink transmission modes, configures downlink communication based on the one of the plurality of downlink transmission modes according to the downlink transmission configuration, and receives a service via PTM transmission based on the one of the plurality of downlink transmission modes that corresponds with the service.

28 Claims, 17 Drawing Sheets

(51) Int. Cl.
| | | |
|---|---|---|
| H04W 72/04 | (2009.01) | |
| H04B 7/06 | (2006.01) | |
| H04B 7/024 | (2017.01) | |
| H04L 12/18 | (2006.01) | |
| H04L 12/24 | (2006.01) | |
| H04W 72/06 | (2009.01) | |
| H04B 7/08 | (2006.01) | |
| H04W 72/00 | (2009.01) | |
| H04L 5/00 | (2006.01) | |
| H04L 29/06 | (2006.01) | |
| H04W 88/02 | (2009.01) | |

(52) U.S. Cl.
CPC ......... *H04B 7/0871* (2013.01); *H04L 12/189* (2013.01); *H04L 41/0803* (2013.01); *H04W 72/0446* (2013.01); *H04W 72/06* (2013.01); *H04L 5/0053* (2013.01); *H04L 65/1063* (2013.01); *H04W 72/005* (2013.01); *H04W 88/02* (2013.01)

(58) Field of Classification Search
CPC .... H04B 7/024; H04B 7/0689; H04B 7/0871; H04L 12/189; H04L 41/0803; H04L 5/0053; H04L 65/1063
See application file for complete search history.

(56) References Cited

U.S. PATENT DOCUMENTS

| | | | |
|---|---|---|---|
| 2014/0071952 A1 | 3/2014 | Kim et al. | |
| 2014/0192700 A1 | 7/2014 | Lee, II et al. | |
| 2014/0334387 A1 | 11/2014 | Doppler et al. | |
| 2015/0003315 A1 | 1/2015 | Chen et al. | |
| 2015/0282134 A1* | 10/2015 | Suzuki | H04L 5/0044 370/329 |
| 2017/0353273 A1* | 12/2017 | Zhang | H04W 4/06 |

FOREIGN PATENT DOCUMENTS

| | | |
|---|---|---|
| EP | 2765723 A1 | 8/2014 |
| EP | 2919538 A1 | 9/2015 |
| JP | 2012502531 A | 1/2012 |
| JP | 2016523498 A | 8/2016 |
| WO | 2014073671 A1 | 5/2014 |
| WO | 2015002439 A1 | 1/2015 |

OTHER PUBLICATIONS

International Search Report and Written Opinion—PCT/CN2015/071911—ISA/EPO—dated Sep. 24, 2015.
International Search Report and Written Opinion—PCT/CN2016/071757—ISA/EPO—dated Apr. 25, 2016.
Huawei, et al., "RP-141920: Motivation of Rel-13 New Study Item proposal for Support of single-cell point-to-multipoint transmission in LTE [online]," 2016, 3GPP TSG-RAN#66, Internet: URL:http://www.3gpp.org/ftpftsg_ran/TSG_RAN/TSGR_66/Docs/RP-141920.zip, Dec. 2, 2014, RP-141920, 19 pages.
Panasonic: "UE capability and time diversity" [online], 3GPP TSG-RAN WG2#51, R1-074929, URL:http://www.3gpp.org/ftp/tsg_ran/WG1_RL1/TSGR1_51/Docs/R1-074929.zip , Nov. 5, 2007, 4 Pages.

* cited by examiner

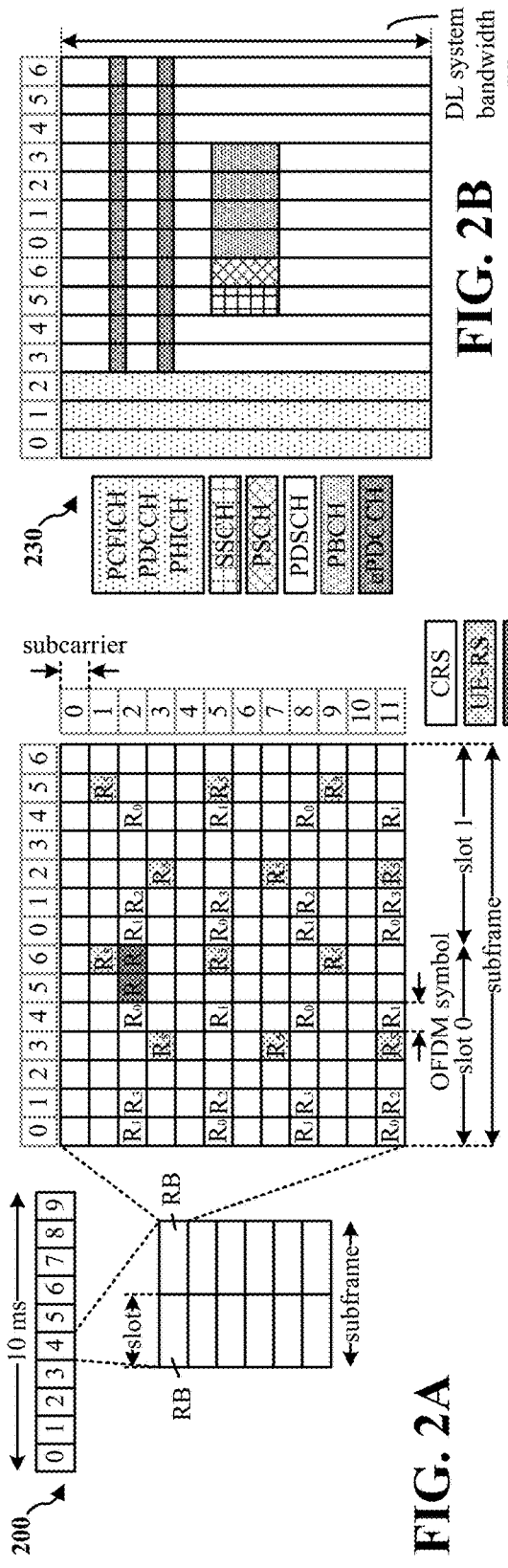
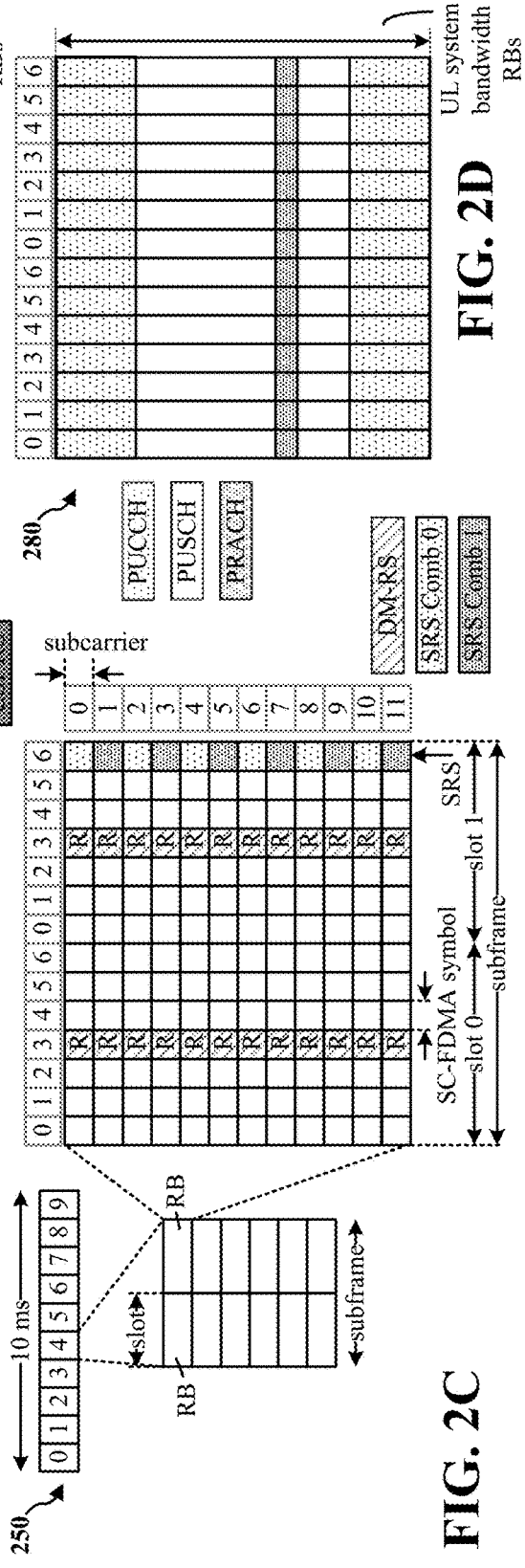
FIG. 2A  FIG. 2B  FIG. 2C  FIG. 2D

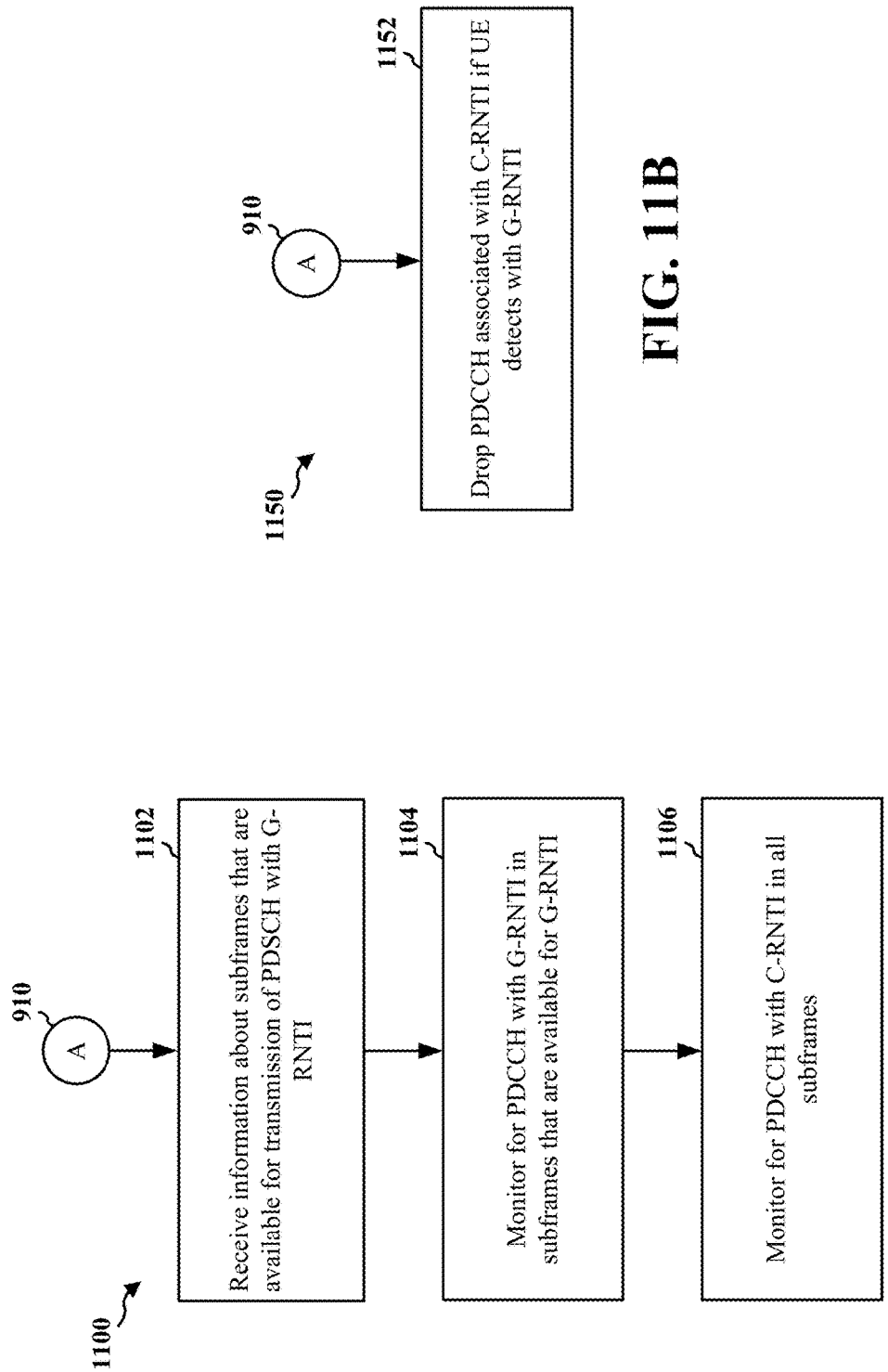

ered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUPPORT OF TRANSMISSION MODE AND IMPACT ON PDCCH BLIND DECODES OF PTM (POINT-TO-MULTIPOINT) TRANSMISSION

CROSS-REFERENCE TO RELATED APPLICATION(S)

This application is a national stage entry of PCT Application Serial No. PCT/CN2016/071757, entitled "SUPPORT OF TRANSMISSION MODE AND IMPACT ON PDCCH BLIND DECODES OF PTM (POINT-TO-MULTIPOINT) TRANSMISSION" and filed Jan. 22, 2016, which claims priority to Chinese PCT Application Serial No. PCT/CN2015/071911, entitled "SUPPORT OF TRANSMISSION MODE AND IMPACT ON PDCCH BLIND DECODES OF PTM (POINT-TO-MULTIPOINT) TRANSMISSION" and filed on Jan. 30, 2015, which is expressly incorporated by reference herein in its entirety.

BACKGROUND

Field

The present disclosure relates generally to communication systems, and more particularly, to a point-to-multipoint transmission.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

A point-to-multipoint transmission has recently been developed to provide a way for a base station to send data to multiple user equipments using the point-to-multipoint transmission. To improve the point-to-multipoint transmission approach, various aspects should be improved.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various improvements are desired for point-to-multipoint (PTM) transmission, where a network sends the PTM transmission to multiple user equipments (UEs).

In an aspect of the disclosure, a method, a computer-readable medium, and an apparatus are provided. The apparatus may be a UE. The UE receives, from a network, a downlink transmission configuration indicating a transmit diversity downlink transmission mode of a plurality of downlink transmission modes. The UE configures downlink communication based on the transmit diversity downlink transmission mode according to the downlink transmission configuration, and receives a service via PTM downlink transmission based on the transmit diversity transmission mode.

In another aspect, the apparatus may be a UE. The UE includes means for receiving, from a network, a downlink transmission configuration indicating a transmit diversity downlink transmission mode of a plurality of downlink transmission modes. The UE includes means for configuring downlink communication based on the transmit diversity downlink transmission mode according to the downlink transmission configuration. The UE includes means for receiving a service via PTM downlink transmission based on the transmit diversity transmission mode.

In another aspect, the apparatus may be a UE including a memory and at least one processor coupled to the memory. The at least one processor is configured to: receive, from a network, a downlink transmission configuration indicating a transmit diversity downlink transmission mode of a plurality of downlink transmission modes, configure downlink communication based on the transmit diversity downlink transmission mode according to the downlink transmission configuration, and receive a service via point-to-multiple (PTM) downlink transmission based on the transmit diversity transmission mode.

In another aspect, a computer-readable medium storing computer executable code for a UE includes code to: receive, from a network, a downlink transmission configuration indicating a transmit diversity downlink transmission mode of a plurality of downlink transmission modes, configure downlink communication based on the transmit diversity downlink transmission mode according to the downlink transmission configuration, and receive a service via PTM downlink transmission based on the transmit diversity transmission mode.

In another aspect of the disclosure, a method, a computer-readable medium, and an apparatus are provided. The apparatus may be an UE. The UE receives, from a network, a downlink transmission configuration indicating one of a plurality of downlink transmission modes. The UE configures downlink communication based on the one of the plurality of downlink transmission modes according to the downlink transmission configuration, and receives a service via PTM transmission based on the one of the plurality of downlink transmission modes that corresponds with the service.

In another aspect, the apparatus may be a UE. The UE includes means for receiving, from a network, a downlink transmission configuration indicating one of a plurality of downlink transmission modes. The UE includes means for configuring downlink communication based on the one of the plurality of downlink transmission modes according to the downlink transmission configuration. The UE includes means for receiving a service via PTM transmission based on the one of the plurality of downlink transmission modes that corresponds with the service.

In another aspect, the apparatus may be a UE including a memory and at least one processor coupled to the memory. The at least one processor is configured to: receive, from a network, a downlink transmission configuration indicating one of a plurality of downlink transmission modes, configure downlink communication based on the one of the plurality of downlink transmission modes according to the downlink transmission configuration, and receive a service via PTM transmission based on the one of the plurality of downlink transmission modes that corresponds with the service.

In another aspect, a computer-readable medium storing computer executable code for a UE includes code to: receive, from a network, a downlink transmission configuration indicating one of a plurality of downlink transmission modes, configure downlink communication based on the one of the plurality of downlink transmission modes according to the downlink transmission configuration, and receive a service via PTM transmission based on the one of the plurality of downlink transmission modes that corresponds with the service.

In another aspect of the disclosure, a method, a computer-readable medium, and an apparatus are provided. The apparatus may be a base station. The base station determines one of a plurality of downlink transmission modes for a service via PTM transmission, and transmits a service to a UE via the PTM transmission based on the one of the plurality of downlink transmission modes that corresponds with the service.

In another aspect, the apparatus may be a base station. The base station includes means for determining one of a plurality of downlink transmission modes for a service via PTM transmission. The base station includes means for transmitting a service to a UE via the PTM transmission based on the one of the plurality of downlink transmission modes that corresponds with the service.

In another aspect, the apparatus may be a UE including a memory and at least one processor coupled to the memory. The at least one processor is configured to: determine one of a plurality of downlink transmission modes for a service via PTM transmission, and transmit a service to a UE via the PTM transmission based on the one of the plurality of downlink transmission modes that corresponds with the service.

In another aspect, a computer-readable medium storing computer executable code for a UE includes code to: determine one of a plurality of downlink transmission modes for a service via PTM transmission, and transmit a service to a UE via the PTM transmission based on the one of the plurality of downlink transmission modes that corresponds with the service.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

FIG. 11A is a flow chart of a method of wireless communication expanding from the flow chart of FIG. 9.

FIG. 11B is a flow chart of a method of wireless communication expanding from the flow chart of FIG. 9.

DETAILED DESCRIPTION

Figure 1:
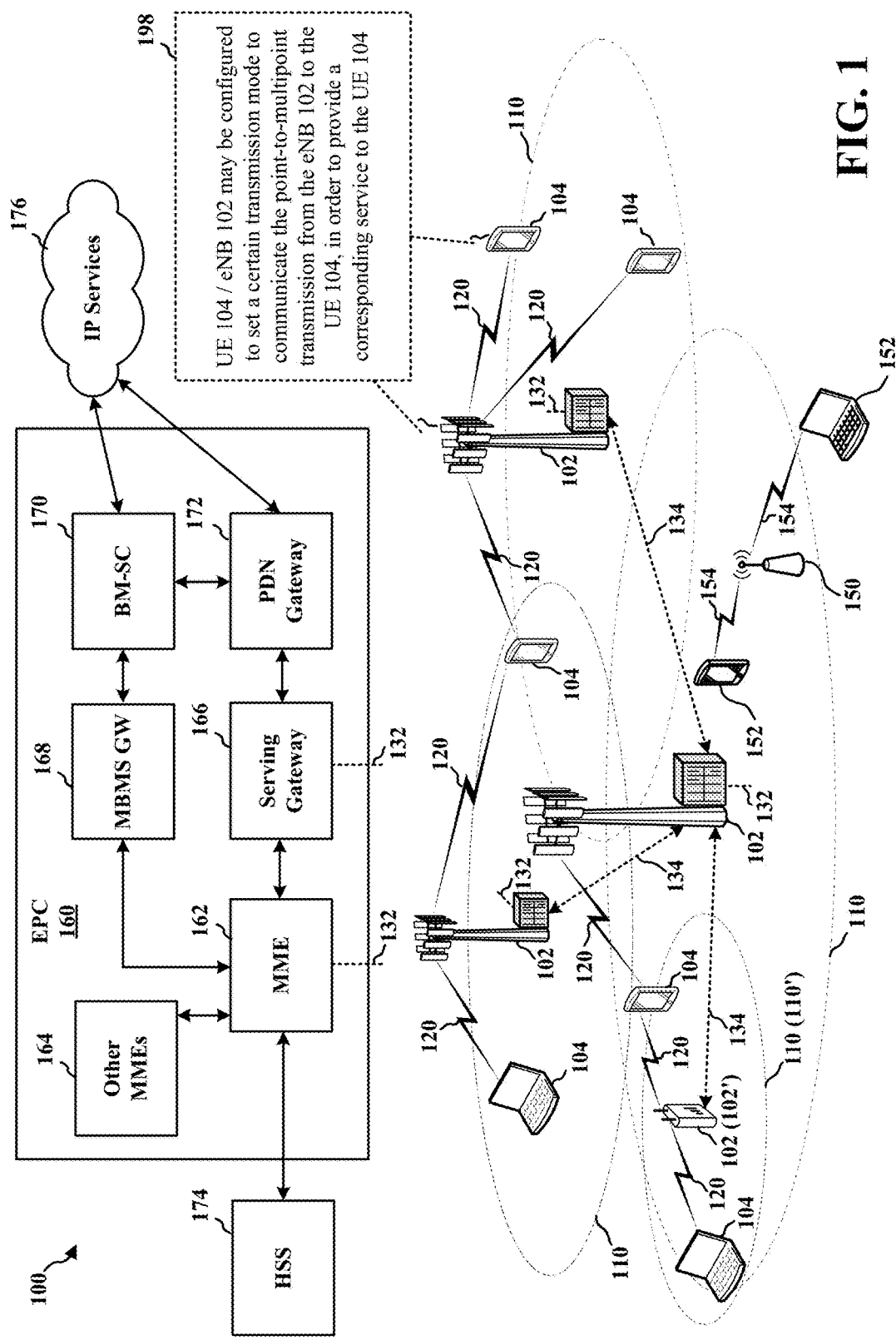
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to set a certain transmission mode to communicate the point-to-multipoint transmission from the eNB 102 to the UE 104, in order to provide a corresponding service to the UE 104 (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
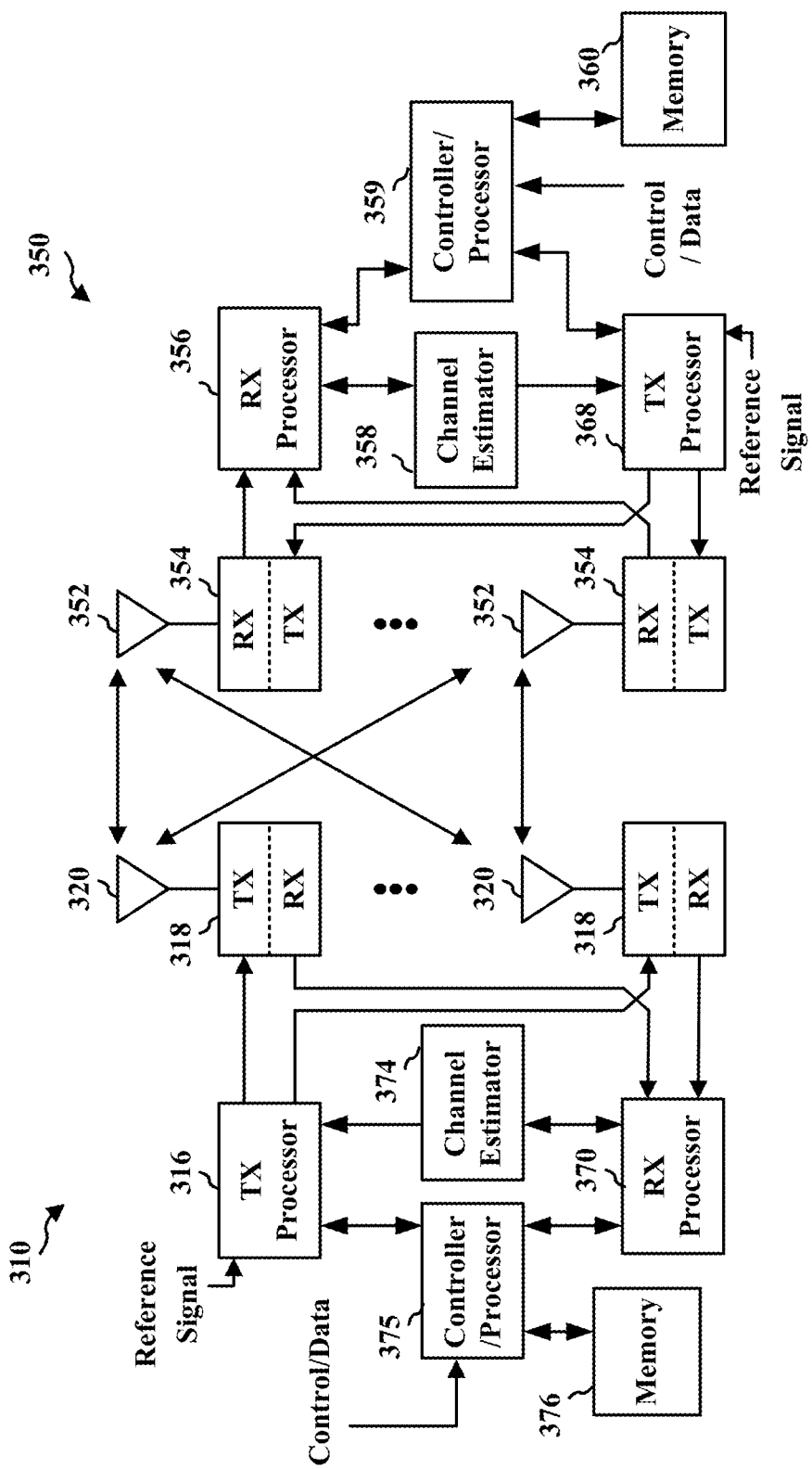
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4C:
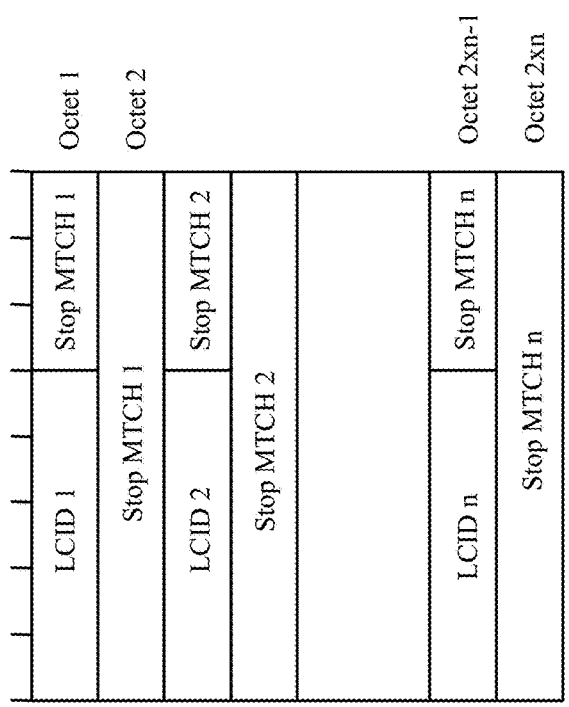
FIG. 4C is a diagram illustrating a format of a Multicast Channel (MCH) Scheduling Information (MSI) Medium Access Control control element.
Figure 4A:
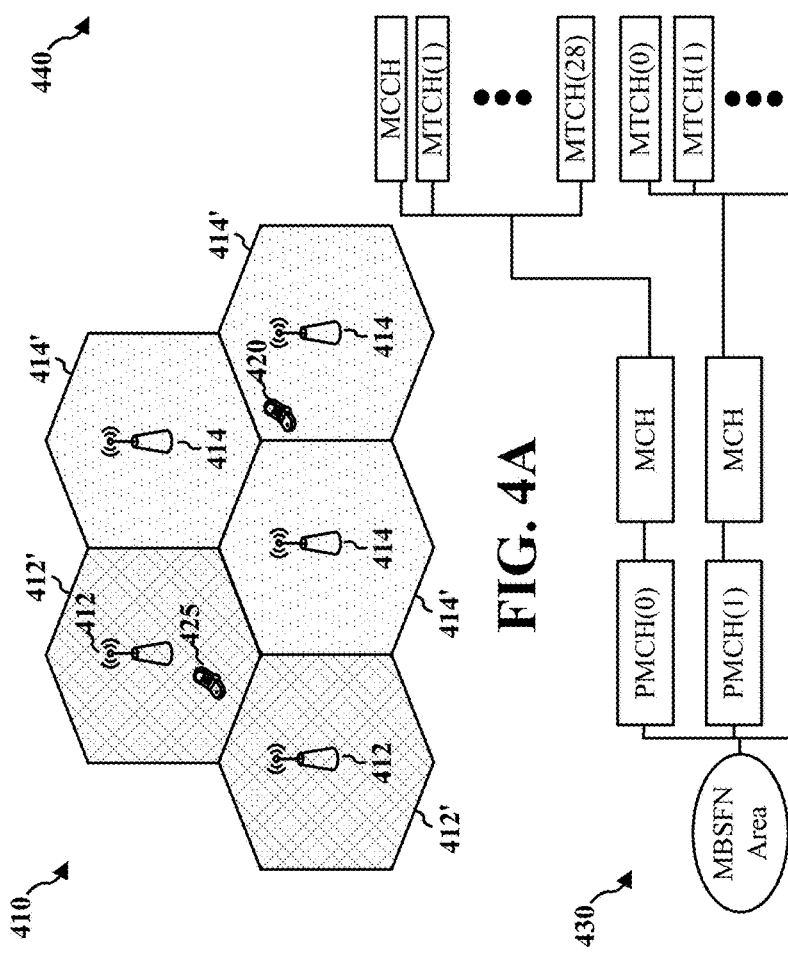
FIG. 4A is a diagram illustrating an example of Multicast Broadcast Single Frequency Network areas in an access network.

FIG. 4A is a diagram 410 illustrating an example of MBSFN areas in an access network. The eNBs 412 in cells 412' may form a first MBSFN area and the eNBs 414 in cells 414' may form a second MBSFN area. The eNBs 412, 414 may each be associated with other MBSFN areas, for example, up to a total of eight MBSFN areas. A cell within an MBSFN area may be designated a reserved cell. Reserved cells do not provide multicast/broadcast content, but are time-synchronized to the cells 412', 414' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 4A, the first MBSFN area may support a first eMBMS broadcast service, such as by providing a particular news broadcast to UE 425. The second MBSFN area may support a second eMBMS broadcast service, such as by providing a different news broadcast to UE 420.

Figure 4B:
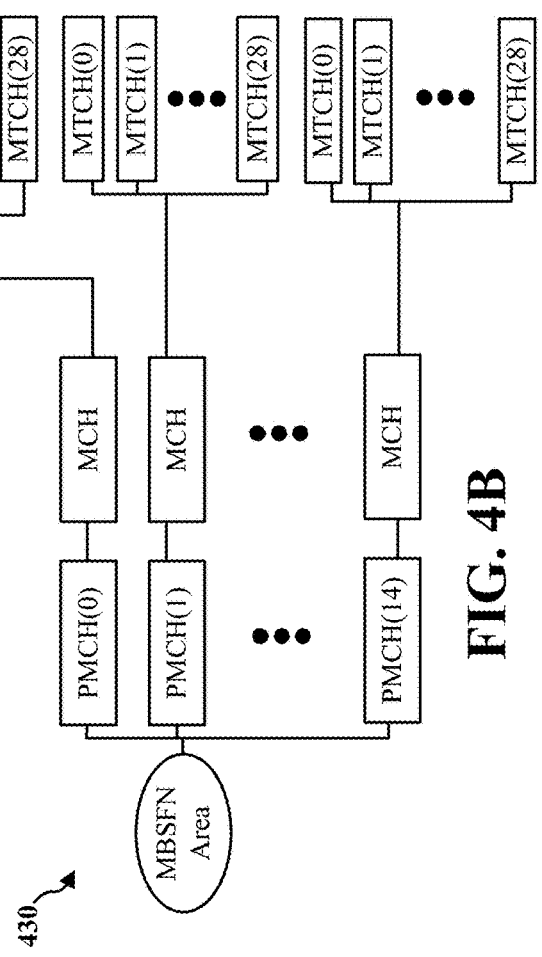
FIG. 4B is a diagram illustrating an example of an evolved Multimedia Broadcast Multicast Service channel configuration in a Multicast Broadcast Single Frequency Network.

FIG. 4B is a diagram 430 illustrating an example of an eMBMS channel configuration in an MBSFN. As shown in FIG. 4B, each MBSFN area supports one or more physical multicast channels (PMCH) (e.g., 15 PMCHs). Each PMCH corresponds to an MCH. Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a SIB 13 (SIB13). Subsequently, based on the SIB13, the UE may acquire an MBSFN Area Configuration message on an MCCH. Subsequently, based on the MBSFN Area Configuration message, the UE may acquire an MSI MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted. A particular TMGI identifies a particular service of available MBMSs services.

FIG. 4C is a diagram 440 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area. A logical channel identifier (LCID) field (e.g., LCID 1, LCID 2, . . . , LCID n) may indicate a logical channel identifier of the MTCH. A Stop MTCH field (e.g., Stop MTCH 1, Stop MTCH 2, . . . , Stop MTCH n) may indicate the last subframe carrying the MTCH corresponding to the particular LCID.

In an MBMS area, the cells associated with the MBMS area may transmit a service in a time synchronized manner. MBMS gain at the UE occurs because the broadcast/multicast transmissions from multiple cells can be combined. However, there may be circumstances when such transmissions from the cells cannot be time synchronized and/or there may be a limited number of UEs interested in a particular service, e.g., a group call. In such circumstances, MBMS transmissions from the cells in the MBMS area may not be feasible or may be inefficient. In such circumstances when there is one or more isolated cells (the neighboring cells are not serving UEs interested in the service), each isolated cell serving two or more UEs, such one or more isolated cells may be configured to operate in a single cell MBSFN mode. Therefore, performance for a single cell transmission targeting for multiple UEs should be improved.

In particular, a network (e.g., an eNB) may transmit the same service to multiple UEs via point-to-multipoint (PTM) transmission, where a single PTM transmission may target multiple UEs. Such PTM transmission may be implemented as a group call. In the PTM transmission, the UEs targeted by the same PTM transmission are in the same group, and thus may be configured with the same identifier such as a radio network temporary identifier (RNTI). For example, the UEs in the same group targeted by the same PTM transmission may be configured with a group RNTI (G-RNTI) that is common among the UEs in the same group, whereas each UE may be configured with another type of RNTI such as a cell RNTI (C-RNTI) for unicast transmission to each UE. In particular, the eNB scrambles a cyclic redundancy check (CRC) with an RNTI, and transmits a physical downlink control channel (PDCCH) with the scrambled CRC. When the UE receives the PDCCH with the scrambled CRC, the UE determines an RNTI corresponding to a service from the eNB, and descrambles the scrambled CRC using the determined RNTI. The UE also generates a CRC based on the received PDCCH, and compares the descrambled CRC and the CRC generated based on the received PDCCH. If the CRC based on the received PDCCH matches with the descrambled CRC, the UE decides to utilize the received PDCCH and determines a PDSCH indicated by the PDCCH.

In a PTM transmission example such as a group call setting, the same G-RNTI is shared among the UEs in the same group. Hence, in the PTM transmission example, each UE in the same group may determine a PDCCH based on the G-RNTI and may use a corresponding PDSCH accordingly in order to receive PTM transmission data on the PDSCH. Thus, in an aspect, PTM transmission may be G-RNTI based transmission. In a unicast transmission example, a UE may try to decode a PDCCH based on the UE's C-RNTI, and may use the information indicated in the PDCCH in order to receive unicast transmission data on the corresponding PDSCH. Thus, in an aspect, unicast transmission may be C-RNTI based transmission. Various improvements may be made for such PTM transmission, as discussed infra.

The UE may be configured with one of several transmission modes for downlink transmission (e.g., to determine how to decode a PDCCH and a PDSCH for data transmission). In particular, the UE may initially send its transmission mode capability to a network, and the network may subsequently send the UE a transmission configuration message indicating which transmission mode the UE should be configured with. Then, the UE may configure downlink transmission with a transmission mode according to the transmission configuration message.

For a group call service where a single transmission targets multiple UEs, the different UEs may experience different geometry (e.g., signal-to-interference-plus-noise ratio). Thus, in order to accommodate the UEs having a wide geometry distribution, transmit diversity may be a preferred communication method to target multiple users via a PTM transmission. Therefore, according to a first approach of the disclosure, a downlink transmission mode for transmit diversity may be supported for the PTM transmission. For example, the network (e.g., eNB) may send a transmission configuration message indicating that the UE should be configured with the transmission mode for the transmit diversity. Thus, the UE may be configured with the transmission mode for transmit diversity to receive the PTM transmission. For example, the downlink transmission mode for transmit diversity may be transmission mode 2 (TM2) for a PDSCH. Because the transmission scheme of the PDSCH for TM2 is transmit diversity, TM2 is suitable for transmission to multiple UEs having different geometry.

Figure 5B:
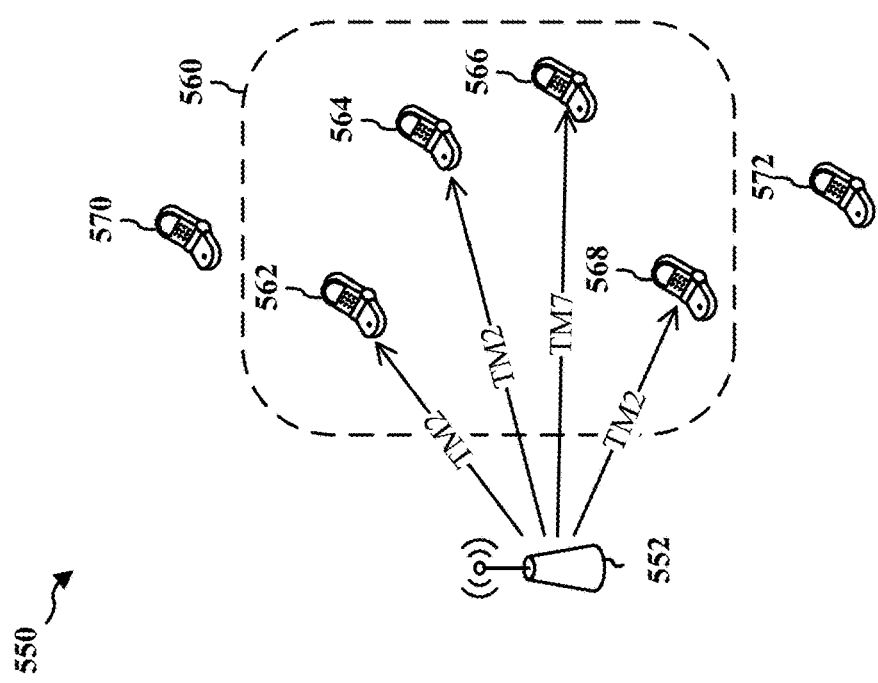
FIG. 5B is an example diagram illustrating a second approach of the disclosure.
Figure 5A:
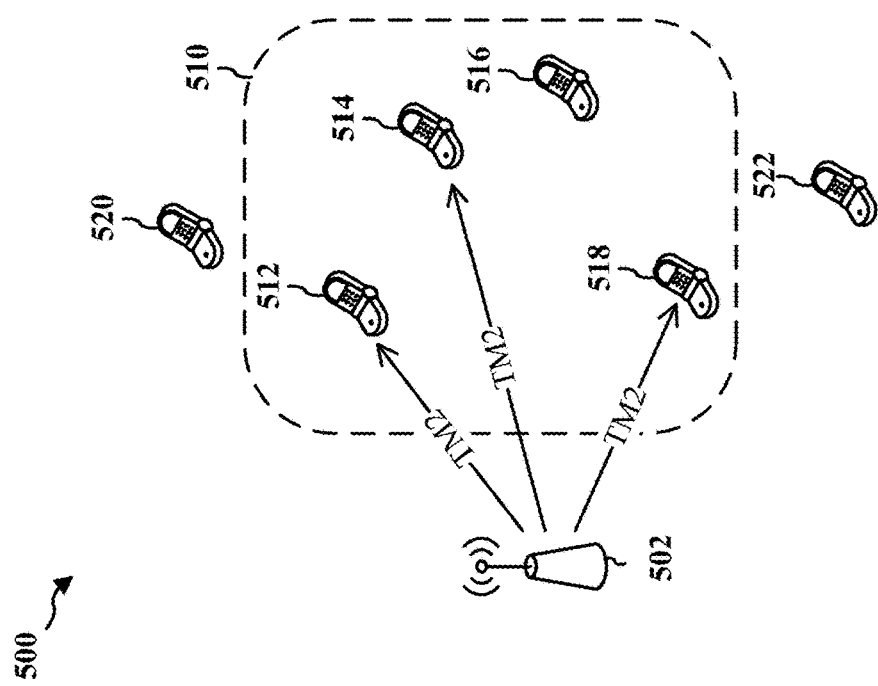
FIG. 5A is an example diagram illustrating a first approach of the disclosure.

FIG. 5A is an example diagram 500 illustrating the first approach of the disclosure. In the example diagram 500, an eNB 502 is capable of performing a PTM transmission with multiple UEs. The UEs 512, 514, 516, and 518 are in the same group 510, and thus may receive the same service via PTM transmission from the eNB 502. The UEs 520 and 522 are not in the same group 510, and thus does not receive the same service via PTM transmission from the eNB 502 as the UEs 512, 514, 516, and 518. The eNB 502 may transmit the service via the PTM transmission using TM2 to the UEs 512, 514, and 518. As discussed above, downlink transmission mode for transmit diversity may be TM 2 for a PDSCH. In this example diagram, the eNB 502 may not transmit the service via TM2 to the UE 516 because UE 516 does not support TM2 for the PTM transmission.

According to a second approach of the disclosure, the UE may be configured with any one of the downlink transmission modes that is appropriate for receiving a service via PTM transmission. For example, the eNB may send a transmission configuration message indicating any one of the downlink transmission modes that is available for a particular service, such that the UE may configure downlink communication accordingly based on the available transmission mode for the particular service and may receive the service via PTM transmission based on the available transmission mode. In the second approach, because multiple downlink transmission modes are available, each service is configured with a particular transmission mode that corresponds with the service. It is noted that the second approach does not mandate all UEs to support a particular transmission mode to receive a service via PTM transmission. In other words, some UEs may support a particular transmission mode, while other UEs may or may not support the same particular transmission mode. If a UE does not support a particular transmission mode for receiving a service via PTM transmission, the UE may not be able to receive a corresponding service via PTM transmission, but may still be able to receive the corresponding service via unicast. For example, if a service is transmitted via transmission mode 7 (TM7) and the UE cannot support TM7, the UE may receive the service via unicast. In addition, in one aspect, certain transmission mode(s) for multi-user MIMO such as transmission mode 5 (TM5) may be excluded from available downlink transmission modes for PTM transmission because multi-user MIMO with a group of UEs may be difficult to enable with TM5.

In one aspect of the second approach, because different services may utilize different transmission modes, each UE may report a transmission mode capability to the network in order for the eNB to configure the PTM transmission to a respective UE. In one aspect, the UEs may report respective transmission mode capabilities to an application server (AS) when the UEs are initially set up for the PTM transmission, and the AS informs the eNB about the reported transmission mode capabilities. For example, if the majority of the UEs in a group support TM7, and report TM7 as the transmission mode capability to the AS, the AS determines that the majority of the UEs support TM7. Subsequently, the AS informs the eNB that the majority of the UEs support TM7, which may cause the eNB to utilize TM7 for the PTM transmission. In another aspect, when a UE first enters a connected mode with an eNB, the UE may report its transmission mode capability to the eNB in preparation for receiving a service via PTM transmission. After reporting the transmission mode capability to the eNB, the UE goes back to an idle mode to listen for the PTM transmission and to receive a service via the PTM transmission when the PTM transmission is sent. For example, if the majority of the UEs report TM7 as the transmission mode capability to the eNB, the eNB may decide to utilize TM7 for the PTM transmission.

In another aspect of the second approach, the eNB may use a higher rank for PTM transmission based on the transmission mode and channel quality indicator (CQI) feedback from the UEs. If the eNB determines (e.g., based on the transmission mode capability reported from the UEs) to use a particular transmission mode for transmitting a particular service via PTM transmission, then the eNB may use CQI feedback from the UEs to decide whether to utilize rank 2 or higher, or rank 1 or lower for the group transmission. For example, the eNB may group high geometry UEs in a high geometry group and low geometry UEs in a low geometry group, based on the CQI feedback from the UEs, and use rank 2/high MCS for the high geometry group and rank 1/low MCS for the low geometry group. If a UE is in the connected mode, the network may determine how often the CQI feedback should be sent from the UE (periodically, e.g., once every 10 ms or 80 ms). The CQI feedback from the UE may be based on unicast transmission to the UE, and may not be based on the PTM transmission.

FIG. 5B is an example diagram 550 illustrating the second approach of the disclosure. In the example diagram 550, an eNB 552 is capable of performing a PTM transmission with multiple UEs. The UEs 562, 564, 566, and 568 are in the same group 560, and thus may receive the same service via PTM transmission from the eNB 552. The UEs 570 and 572 are not in the same group 560, and thus does not receive the same service via PTM transmission from the eNB 502 as the UEs 562, 564, 566, and 568. In the second approach, because a UE may be configured with any one of the downlink transmission modes that is appropriate for receiving a service via PTM transmission, the eNB 552 may transmit the service via the PTM transmission using any of transmission modes supported by the UE. Thus, in the example diagram 550, the eNB 552 transmits a particular service via PTM transmission using TM2 to the UEs 562, 564, and 568. In the example diagram 550, the eNB 552 transmits the particular service via unicast transmission using TM 7 to the UE 566. The UE 566 receives the particular service via unicast transmission because the UE 566 does not support TM2 that is associated with the particular service.

Various aspects are described for supporting C-RNTI based transmissions and/or G-RNTI based transmissions in the same subframe. According to a first method, the UE may support either a C-RNTI based PDSCH or G-RNTI based PDSCH on the same carrier in the same subframe, but not both the C-RNTI based PDSCH and the G-RNTI based PDSCH in the same subframe. Thus, according to the first method, a C-RNTI based PDSCH may be in one subframe, and a G-RNTI based PDSCH maybe in a different subframe. The C-RNTI may be used for unicast transmission and the G-RNTI may be used for the PTM transmission (e.g., to a group of UEs). Such method is similar to not supporting both PMCH and PDSCH on the same carrier in the same subframe. The UE may be signaled (e.g., by the eNB) with information about potential subframes that may be scheduled for the G-RNTI (e.g., subframes potentially having a PDCCH scrambled with the G-RNTI). For example, the eNB may provide the UE with PTM configuration information including the information about the potential subframes that may be scheduled for G-RNTI, where the eNB may send the PTM configuration via an MCCH and/or MSI and/or a SIB and/or dedicated RRC signaling. Within those potential subframes, the UE monitors for a G-RNTI based transmission and may not monitor for a C-RNTI based transmission. Hence, the UE does not have to perform blind PDCCH decoding for both G-RNTI and C-RNTI, and thus there is no increase in a number of PDCCH blind decodes (thus no increase in complexity).

In a second method, the UE may support concurrent reception of a C-RNTI based PDSCH and a G-RNTI based PDSCH in the same subframe. It is noted that, in eMBMS, the UE may not support both unicast and multicast in the same subframe because different types of cyclic prefixes (CPs) are used for unicast transmission and multicast transmission. However, with implementation of a group bearer (e.g., via G-RNTI), the UE may support both unicast transmission and the PTM transmission via the same subframe using the C-RNTI for the unicast transmission and the G-RNTI for the PTM transmission because the same type of CP may be used for both the C-RNTI and the G-RNTI with the implementation of the group bearer. As the UE supports concurrent reception of the C-RNTI based PDSCH and the G-RNTI based PDSCH in the same subframe, the UE also decodes a PDCCH using both the C-RNTI and the G-RNTI in the same subframe.

It is noted that a total data rate with unicast transmission corresponding with the C-RNTI and PTM transmission corresponding with the G-RNTI should be consistent with UE capability. The UE may report the UE capability to the eNB when the UE connects to the eNB. The UE may send an MBMS interest indication message to the eNB, so that the eNB may configure the PTM transmission based on the MBMS interest indication message. Thus, the eNB may schedule the unicast transmission according to the UE capability and the MBMS interest indication message. In an aspect, based on the MBMS interest indication message, the eNB may set the data rate for the unicast transmission to be no higher than a difference between the UE capability and the data rate set for the PTM transmission. For example, if the UE has UE capability to receive 1000 bits per subframe, and if the UE is configured to use 600 bits per subframe for the PTM transmission, the eNB may set the data rate for unicast transmission to the UE to a data rate that does not exceed 400 bits per subframe based on the MBMS interest indication message.

Typically, the MBMS interest indication message includes MBMS frequencies, but may not identify which particular service to receive. For example, unless the UE reports a specific TMGI associated with a particular service, the eNB may not be able to determine which particular service the UE is interested in receiving. It is noted that a TMGI uniquely identifies a group bearer that carries a particular service. If the UE does not indicate a specific PTM service (e.g., via the MBMS interest indication message), the eNB may set the data rate for the unicast transmission by considering the highest data rate among the data rates of all possible PTM services based on the MBMS interest indication message. Thus, in an aspect of the second method, the eNB may set the data rate for the unicast transmission to be no higher than a difference between the UE capability and the highest data rate among the data rates of all possible PTM services. For example, if the UE capability is 1000 bits per subframe and the highest data rate among the data rates of all PTM services is 600 bits per subframe, then the eNB may set the data rate for the unicast to be no higher than 400 bits per subframe. Thus, if the UE does not indicate a specific PTM service, the eNB may assume the worst case for the data rate for unicast transmission by considering highest rate for the PTM transmission.

In the second method, for better UE battery consumption, the UE can be signaled (e.g., by the eNB) about potential subframes which can be potentially scheduled for the G-RNTI. For example, the eNB may provide the UE with PTM configuration information including the information about the potential subframes that may be scheduled for G-RNTI, where the eNB may send the PTM configuration via an MCCH and/or MSI and/or a SIB and/or dedicated RRC signaling. Subsequently, according to an aspect of the second method, the UE may be configured to monitor for the G-RNTI based transmission on these potential subframes, instead of monitoring for the G-RNTI based transmission on all subframes. Because the UE is configured to monitor for the G-RNTI based transmissions only on the potential subframes, not on all subframes, battery power of the UE may be saved. The UE may be configured to monitor for the C-RNTI based transmissions in all subframes. The UE may not monitor for C-RNTI based transmissions when the UE is not in a connected mode.

In a third method, the UE may monitor for both G-RNTI and C-RNTI in the same subframe, but may drop a C-RNTI grant if the UE detects a G-RNTI grant in the same subframe. Thus, in the third method, because the UE drops the C-RNTI grant upon detection of the G-RNTI grant in the same subframe, the UE ends up supporting either C-RNTI based PDSCH or G-RNTI based PDSCH in the same subframe.

As described above, concurrent reception of a C-RNTI based PDSCH and a G-RNTI based PDSCH in the same subframe may be supported (e.g., according to the second method). Various aspects are now described to reduce the impact on PDCCH blind decodes with support for the concurrent reception of C-RNTI based transmission and G-RNTI based transmission in the same subframe on one carrier. In order to decode a PDCCH, a UE may blindly decode a PDCCH from several possible formats and control channel elements (CCEs) associated with the PDCCH. In an aspect, a number of PDCCH blind decodes is increased when the C-RNTI based transmissions and the G-RNTI based transmissions use different transmission modes. Typically, a UE-specific search space is associated with the C-RNTI or any other RNTI related to unicast transmission. Thus, it is noted that, typically, CCEs associated with the UE-specific search space are used to send the control information that is specific to a particular UE, whereas CCEs associated with the common search space are used to send the control information that is common for all the UEs.

In this aspect of the disclosure, the UE-specific search space may be associated with the G-RNTI. Further, in such an aspect, to limit the increase in the number of PDCCH blind decodes, a PDCCH associated with G-RNTI can be limited to a certain control channel element (CCE) aggregation level. Typically, in the UE specific search space, the CCE aggregation levels 1, 2, 4, and 8 may exist for each DCI format, and two DCI formats may be searched for each aggregation level. Thus, in the typical UE-specific search space, each DCI format will incur 16 blind decodes, with 6 blind decodes for each of aggregation levels 1 and 2 and 2 blind decodes for each of aggregation levels 4 and 8. In this aspect of the disclosure, For example, possible CCE aggregation levels may be limited to level 4 and level 8 for each DCI format for group transmission. Because two blind decodes may be performed for each of CCE aggregation levels 4 and 8, each DCI format will incur 4 blind decodes with the G-RNTI (two blind decodes for level 4 and two blind decodes for level 8). It is noted that the PTM transmission targets many UEs and thus the PTM transmission covering UEs with different geometry is desired. The UE may consider the CCE aggregation levels 4 and 8 to cover UEs with different geometry, without considering the CCE aggregation levels 1 and 2. In another aspect, the common search space may be associated with the G-RNTI. In the common search space, only CCE aggregation levels 4 and 8 are allowed with four blind decodes for aggregation level 4 and 2 blind decodes for aggregation level 8. Therefore, instead of performing two blind decodes for level 4 and two blind decodes for level 8 in the UE-specific search space, four blind decodes may be performed for level 4 and two blind decodes may be performed for level 8 in the common search space, which results in 6 blind decodes total. It is noted that the PDCCH with the G-RNTI in the UE-specific search space may be associated with DCI format 1A. It is further noted that the PDCCH associated with the G-RNTI is sent in a common search space.

In another aspect, no increase in the number of PDCCH blind decodes may be achieved by supporting DCI format 1A associated with a PDCCH with G-RNTI in a common search space. In particular, by supporting DCI format 1A associated with the PDCCH with G-RNTI in a common search space, without supporting other DCI formats, the number of PDCCH blind decodes may not be increased even when the UE supports concurrent reception of both the C-RNTI based PDSCH and the G-RNTI based PDSCH in the same subframe. If we use DCI format 1A which is common across all the UEs, then there is no blind decode increase. In such an aspect, the UE may further support DCI format 1A associated with a PDCCH with the G-RNTI in a UE-specific search space. In such an aspect, the transmission mode for transmit diversity (e.g. TM2) may be preferred for PTM transmission.

In another aspect, no increase in the number of PDCCH blind decodes may be achieved by introducing new DCI formats. For each transmission mode, there is a DCI format that is specific to a respective transmission mode. Each DCI format that is transmission mode specific may be modified to specify a new DCI format for the PTM transmission, where the size of the new DCI format is aligned with DCI format 1A. The UE defines that the new DCI format is supported in a common search space. For example, if the UE is in TM7 and DCI format 2D is specific to TM7, the UE may modify DCI format 2D to be DCI format 2D' that has the same size as DCI format 1A, and defines that the DCI format 2D' is supported in the common search space. Thus, when the UE searches DCI format 1A, the UE may find DCI format 2D'. The UE may define that the new DCI format is supported in a UE-specific search space, where the UE-specific search space is associated with a PDCCH associated with the G-RNTI.

Semi-persistent scheduling (SPS) for PTM transmission may be supported in certain aspects. SPS scheduling for PTM may be desirable because the PTM transmission may provide public safety, and unicast may use SPS for voice over IP (VoIP). The SPS G-RNTI (and/or SPS C-RNTI) may be signaled for each PTM service. However, if the UE receives a G-RNTI, the UE overwrites the SPS G-RNTI with the received G-RNTI. In one aspect, the UE may support SPS G-RNTI based PDSCH and C-RNTI/SPS C-RNTI PDSCH in the same subframe. In another aspect, the UE may support only a single SPS configuration, where SPS G-RNTI has higher priority over C-RNTI/SPS C-RNTI. In such an aspect, if the UE is signaled with information about the subframes that include the SPS G-RNTI based transmission, the UE monitors for G-RNTI/SPS G-RNTI in such subframes without monitoring for C-RNTI/SPS C-RNTI in such subframes (thus having no impact on the number of PDCCH blind decodes). If the UE is not signaled on the subframes where SPS G-RNTI is sent, the UE searches for a PDCCH with both G-RNTI/SPS G-RNTI and C-RNTI/SPS C-RNTI. If, as a result of the search, the UE finds a PDCCH with both G-RNTI/SPS G-RNTI and C-RNTI/SPS C-RNTI, the UE drops C-RNTI/SPS C-RNTI.

Figure 6:
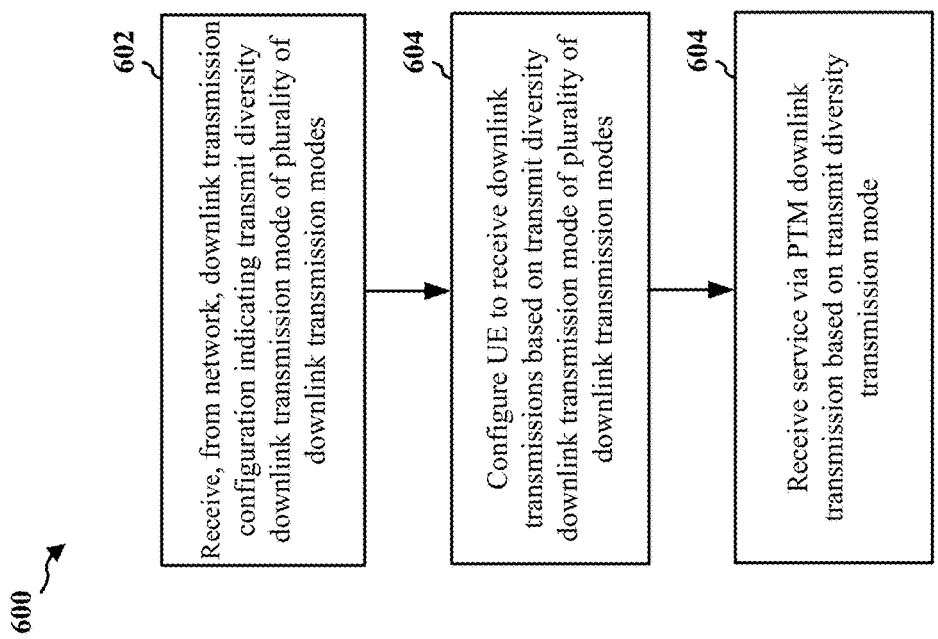
FIG. 6 is a flowchart of a method of wireless communication, according to a first approach of the disclosure.

FIG. 6 is a flowchart 600 of a method of wireless communication according to the first approach of the disclosure. The method may be performed by a UE (e.g., the UE 512, the apparatus 702/702'). At 602, the UE receives, from a network, a downlink transmission configuration indicating a transmit diversity downlink transmission mode of a plurality of downlink transmission modes. At 604, the UE configures downlink communication based on the transmit diversity downlink transmission mode according to the downlink transmission configuration. At 606, the UE receives a service via PTM downlink transmission based on the transmit diversity transmission mode. For example, as discussed supra, the network (e.g., eNB) may send a transmission configuration message indicating that the UE should be configured with the transmission mode for the transmit diversity. For example, as discussed supra, the UE may be configured with the transmission mode for transmit diversity to receive the PTM transmission. In an aspect, the transmit diversity downlink transmission mode is mode 2 for a PDSCH. For example, as discussed supra, the downlink transmission mode for transmit diversity may be TM2 for a PDSCH.

In an aspect, the UE is configured to support concurrent reception of both a PDSCH that is based on a C-RNTI and a PDSCH that is based on a G-RNTI in a same subframe. For example, as discussed supra, the UE may support concurrent reception of a C-RNTI based PDSCH and a G-RNTI based PDSCH in the same subframe. In an aspect, a PDCCH with the G-RNTI in a common search space is associated with DCI format 1A. In an aspect, a PDCCH with the G-RNTI in a UE-specific search space is associated with DCI format 1A. For example, as discussed supra, by supporting DCI format 1A associated with the PDCCH with G-RNTI in a common search space, without supporting other DCI formats, the number of PDCCH blind decodes may not be increased even when the UE supports concurrent reception of both the C-RNTI based PDSCH and the G-RNTI based PDSCH in the same subframe. For example, as discussed supra, the UE may further support DCI format 1A associated with a PDCCH with the G-RNTI in a UE-specific search space.

Figure 7:
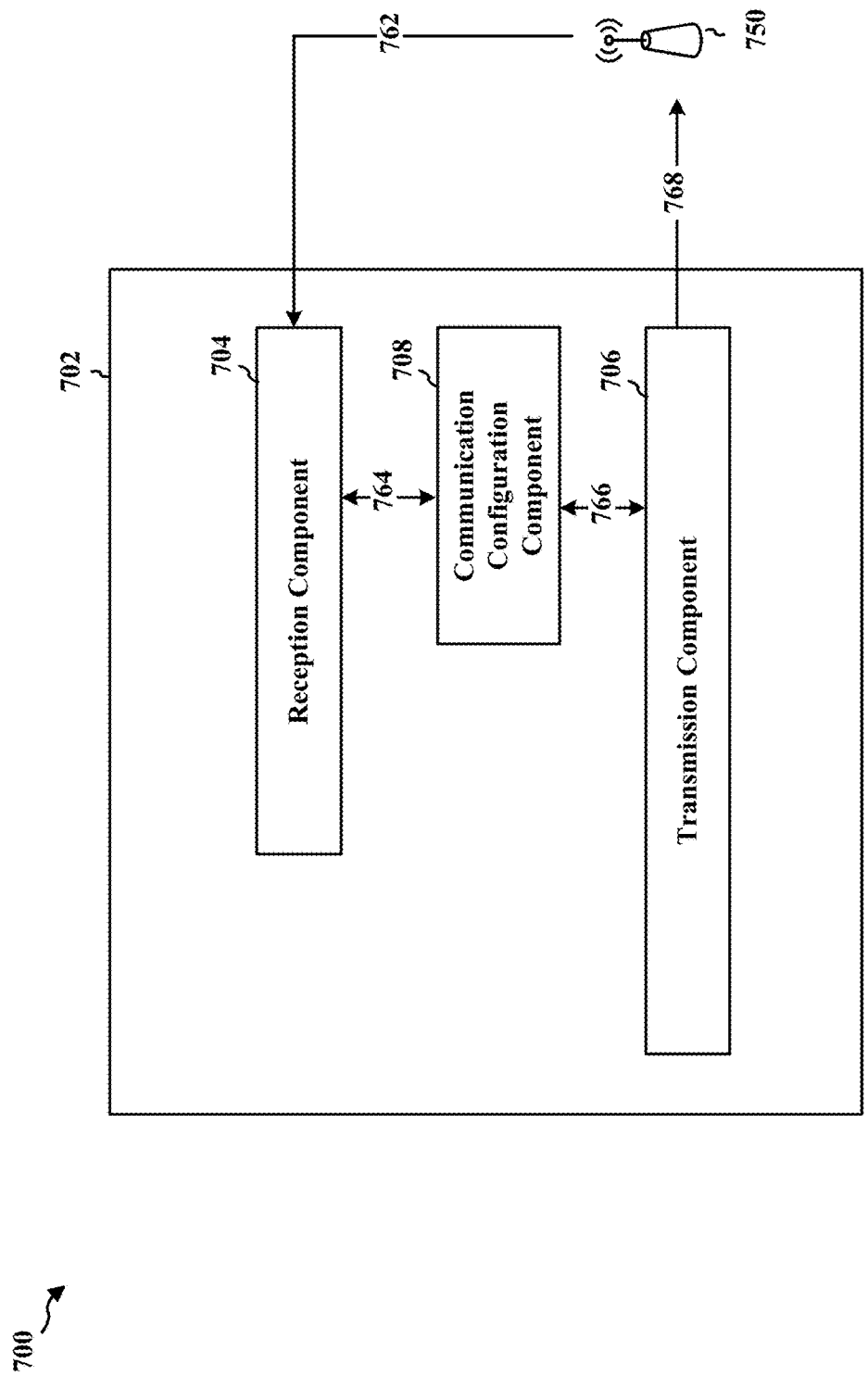
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE. The apparatus includes a reception component 704, a transmission component 706, and a communication configuration component 708.

The communication configuration component 708 receives via the reception component 704, from a network (e.g., eNB 750), a downlink transmission configuration indicating a transmit diversity downlink transmission mode of a plurality of downlink transmission modes, at 762 and 764. The communication configuration component 708 configures downlink communication based on the transmit diversity downlink transmission mode according to the downlink transmission configuration. The reception component 704 receives a service via PTM downlink transmission based on the transmit diversity transmission mode, at 762. In an aspect, the transmit diversity downlink transmission mode is mode 2 for a PDSCH. The communication configuration component 708 may communicate a communication configuration with the transmission component 706 at 766, such that the transmission component 706 may send data to the eNB 750, at 768, based on the communication configuration.

In an aspect, the UE is configured via the communication configuration component 708 to support concurrent reception of both a PDSCH that is based on a C-RNTI and a PDSCH that is based on a G-RNTI in a same subframe. In an aspect, a PDCCH with the G-RNTI in a common search space is associated with DCI format 1A. In an aspect, a PDCCH with the G-RNTI in a UE-specific search space is associated with DCI format 1A.

The apparatus may include additional components that perform each of the blocks of the algorithm in the aforementioned flowcharts of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
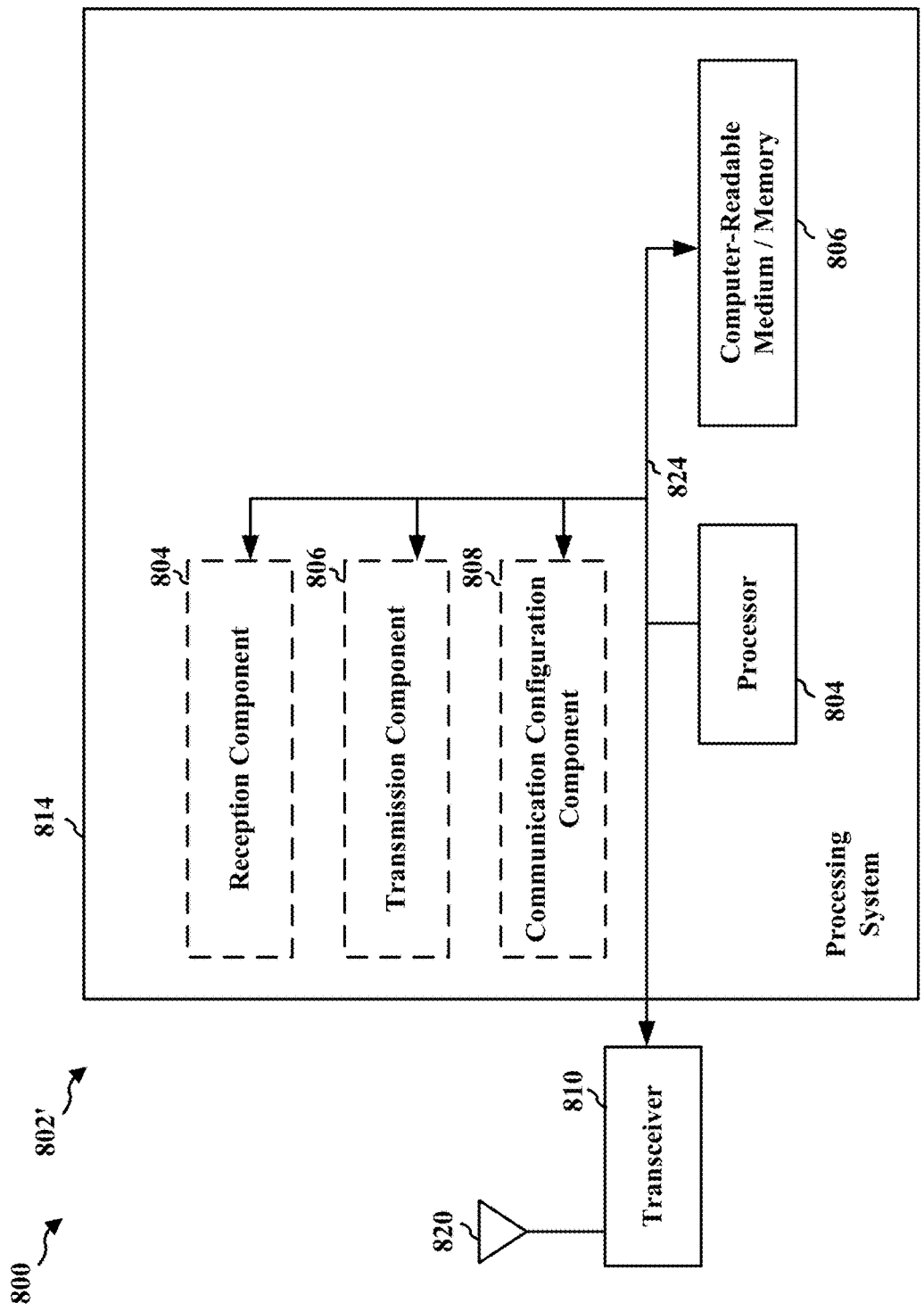
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for receiving, from a network, a downlink transmission configuration indicating a transmit diversity downlink transmission mode of a plurality of downlink transmission modes, means for configuring downlink communication based on the transmit diversity downlink transmission mode according to the downlink transmission configuration, and means for receiving a service via PTM downlink transmission based on the transmit diversity transmission mode. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
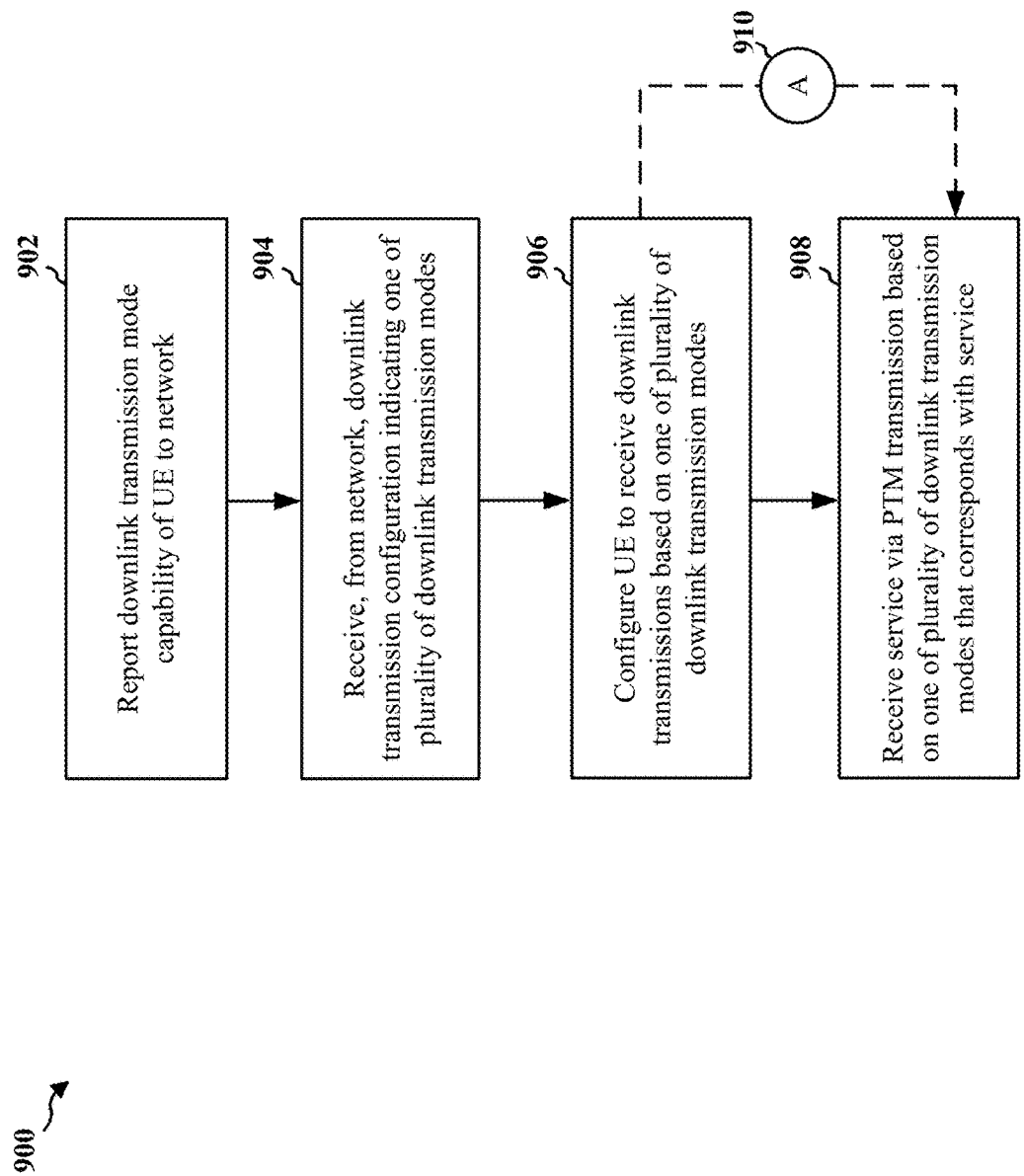
FIG. 9 is a flow chart of a method of wireless communication, according to a second approach of the disclosure.

FIG. 9 is a flow chart of a method of wireless communication, according to the second approach of the disclosure. The method may be performed by a UE (e.g., the UE 562, the apparatus 1202/1202'). At 902, the UE reports a downlink transmission mode capability of the UE to a network. In an aspect, the reported downlink transmission mode capability is used to configure the PTM transmission with one of the plurality of downlink transmission modes. For example, as discussed supra, each UE may report a transmission mode capability to the network in order for the eNB to configure the PTM transmission to a respective UE. In an aspect, the UE may report the downlink transmission capability by reporting the downlink transmission mode capability to an AS when the UE initially connects to the AS that is configured to indicate to the base station the downlink transmission mode capability. For example, as discussed supra, the UEs may report respective transmission mode capabilities to an AS when the UEs are initially set up for the PTM transmission, and the AS informs the eNB about the reported transmission mode capabilities. In another aspect, the UE may report the downlink transmission capability by entering a connected mode with a base station to report the downlink transmission mode capability to the base station when the UE determines to receive the PTM transmission, where the UE enters an idle mode to receive the PTM transmission after reporting the downlink transmission mode. For example, as discussed supra, when the UE first enters a connected mode with an eNB as the UE prepares to receive a service from the eNB via PTM transmission, the UE may report its transmission mode capability to the eNB. For example, as discussed supra, after reporting the transmission mode capability to the eNB, the UE goes back to an idle mode in order to listen for the PTM transmission and receive a service via PTM transmission.

At 904, the UE receives, from the network, a downlink transmission configuration indicating one of a plurality of downlink transmission modes. At 906, the UE configures downlink communication based on the one of the plurality of downlink transmission modes according to the downlink transmission configuration. At 908, the UE receives a service via PTM transmission based on the one of the plurality of downlink transmission modes that corresponds with the service. For example, as discussed supra, the eNB may send a transmission configuration message indicating any one of the downlink transmission modes that is available for a particular service, such that the UE may configure downlink communication accordingly based on the available transmission mode for the particular service and may receive the service via PTM transmission based on the available transmission mode. Further descriptions with regard to 910 are provided infra. In an aspect, the plurality of downlink transmission modes are transmission modes for a PDSCH. For example, as discussed supra, the UE may be configured with any one of the downlink transmission modes that is appropriate for receiving a service via PTM transmission.

In an aspect, the UE receives the service via the PTM transmission based on a rank for PTM transmission. For example, as discussed supra, the eNB may use a higher rank for PTM transmission based on the transmission mode and CQI feedback from the UE. Thus, the UE may receive the PTM transmission based on the higher rank.

Figures 10A, 10B:
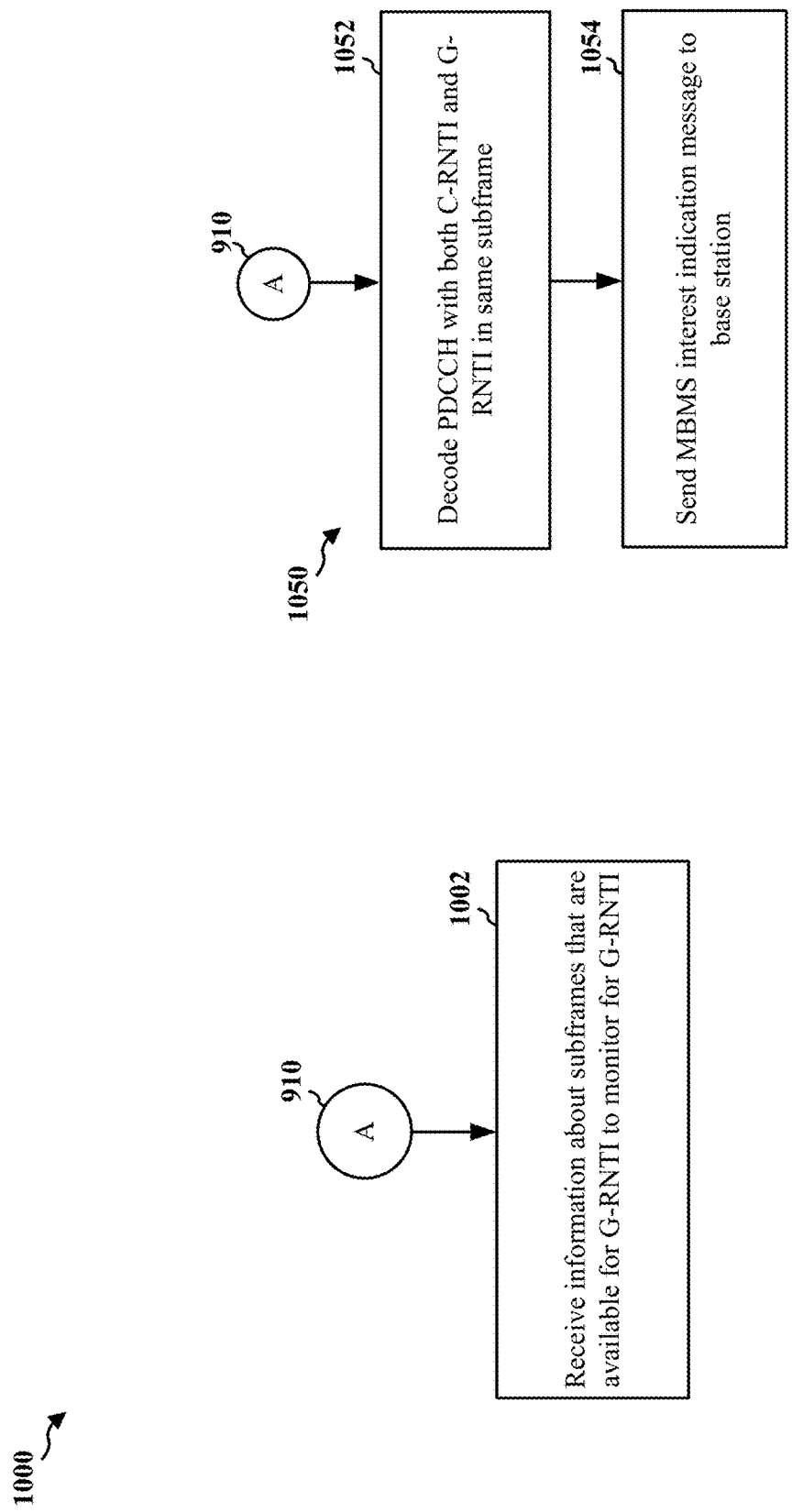
FIG. 10A is a flow chart of a method of wireless communication expanding from the flow chart of FIG. 9.
FIG. 10B is a flow chart of a method of wireless communication expanding from the flow chart of FIG. 9.

FIG. 10A is a flow chart 1000 of a method of wireless communication expanding from the flow chart 9 of FIG. 9. In the flow chart 1000, the UE is configured to support reception of either a PDSCH that is based on a C-RNTI or a PDSCH that is based on a G-RNTI in a same subframe. For example, as discussed supra, the UE may support either a C-RNTI based PDSCH or G-RNTI based PDSCH on the same carrier in the same subframe. The method may be performed by the UE. At 910, the UE may continue from 910 of FIG. 9.

At 1002, the UE receives information about subframes that are available for the G-RNTI to monitor for the G-RNTI. For example, as discussed supra, the UE is to be signaled (e.g., by the eNB) with information about potential subframes that may be scheduled for G-RNTI, and within those potential subframes, the UE monitors for a G-RNTI and may not monitor for a C-RNTI.

In an aspect, the G-RNTI is an SPS G-RNTI. In an aspect, the C-RNTI is an SPS C-RNTI. In an aspect, if the UE receives information on the subframes to be monitored for the G-RNTI, the UE monitors for at least one of a G-RNTI or an SPS G-RNTI, without monitoring for a C-RNTI or an SPS C-RNTI, and if the UE does not receive information on the subframes to be monitored for the G-RNTI, the UE monitors for at least one of a G-RNTI or an SPS G-RNTI and for at least one of a C-RNTI or an SPS C-RNTI. For example, as discussed supra, the SPS G-RNTI (and/or SPS C-RNTI) may be signaled for each PTM service. For example, as discussed supra, the UE may support SPS G-RNTI based PDSCH and C-RNTI/SPS C-RNTI PDSCH in the same subframe. For example, as discussed supra, if the UE is signaled on the subframes where SPS G-RNTI is sent, the UE monitors for G-RNTI/SPS G-RNTI in such subframes without monitoring for C-RNTI/SPS C-RNTI in such subframes (thus having no impact on the number of PDCCH blind decodes performed by the UE). For example, as discussed supra, if the UE is not signaled on the subframes where SPS G-RNTI is sent, the UE searches for a PDCCH with both G-RNTI/SPS G-RNTI and C-RNTI/SPS C-RNTI. In an aspect, if the UE detects a PDCCH with at least one of a G-RNTI or an SPS G-RNTI after monitoring for at least one of a G-RNTI or an SPS G-RNTI and for at least one of a C-RNTI or an SPS C-RNTI, the UE stops monitoring a PDCCH with a C-RNTI and an SPS C-RNTI in the subframe. For example, as discussed supra, if the UE finds a PDCCH with both G-RNTI/SPS G-RNTI and C-RNTI/SPS C-RNTI, the UE drops C-RNTI/SPS C-RNTI.

FIG. 10B is a flow chart 1050 of a method of wireless communication expanding from the flow chart 900 of FIG. 9. In the flow chart 1050, the UE is configured to support concurrent reception of both a PDSCH that is based on a C-RNTI and a PDSCH that is based on a G-RNTI in a same subframe. For example, as discussed supra, the UE may support concurrent reception of a C-RNTI based PDSCH and a G-RNTI based PDSCH in the same subframe. The method may be performed by the UE. At 910, the UE may continue from 910 of FIG. 9.

At 1052, the UE decodes a PDCCH with both the C-RNTI and the G-RNTI in the same subframe. For example, as discussed supra, as the UE supports concurrent reception of the C-RNTI based PDSCH and the G-RNTI based PDSCH in the same subframe, the UE also decodes a PDCCH with both the C-RNTI and the G-RNTI in the same subframe. At 1054, the UE sends an MBMS interest indication message to a base station. The base station may configure a unicast data rate associated with C-RNTI based on the MBMS interest indication for the PTM transmission. For example, as discussed supra, the UE may send an MBMS interest indication message to the eNB, so that the eNB may configure the PTM transmission based on the MBMS interest indication message. In an aspect, the unicast data rate associated with the C-RNTI is set to be equal to a highest data rate for the PTM transmission if the MBMS interest indication message does not indicate a service. For example, as discussed supra, if the UE does not indicate a specific PTM service (e.g., via the MBMS interest indication message), the eNB may set the data rate for the unicast transmission by considering the highest data rate among the data rates of all possible PTM services based on the MBMS interest indication message. In an aspect, the G-RNTI is an SPS G-RNTI. In an aspect, the C-RNTI is an SPS C-RNTI. For example, as discussed supra, the SPS G-RNTI (and/or SPS C-RNTI) may be signaled for each PTM service.

FIG. 11A is a flow chart 1100 of a method of wireless communication expanding from the flow chart 900 of FIG. 9. In the flow chart 1100, the UE is configured to support concurrent reception of both a PDSCH that is based on a C-RNTI and a PDSCH that is based on a G-RNTI in a same subframe. The method may be performed by the UE. At 910, the UE may continue from 910 of FIG. 9.

At 1102, the UE receives information about subframes that are available for transmission of the PDSCH with the G-RNTI. At 1104, the UE monitors for a PDCCH with the G-RNTI in the subframes that are available for the G-RNTI. At 1106, the UE monitors for a PDCCH with the C-RNTI in all subframes. For example, as discussed supra, the UE can be signaled (e.g., by the eNB) about potential subframes which can be potentially scheduled for the G-RNTI, and then may be configured to monitor for the G-RNTI on these potential subframes. For example, as discussed supra, the UE may be configured to monitor for the C-RNTI on all subframes.

FIG. 11B is a flow chart 1150 of a method of wireless communication expanding from the flow chart 900 of FIG. 9. In the flow chart 1150, the UE is configured to support concurrent reception of both a PDSCH that is based on a C-RNTI and a PDSCH that is based on a G-RNTI in a same subframe. The method may be performed by the UE. At 910, the UE may continue from 910 of FIG. 9.

In an aspect, at 1152, the UE drops a PDCCH associated with the C-RNTI if the UE detects a PDCCH with the G-RNTI. For example, as discussed supra, the UE may monitor for both G-RNTI and C-RNTI in the same subframe, but may drop C-RNTI grant if the UE detects G-RNTI grant in the same subframe.

In an aspect, a PDCCH with the G-RNTI is received in a UE-specific search space where the UE-specific search space is associated with the G-RNTI. In such an aspect, in the UE-specific search space, the PDCCH with the G-RNTI is limited to a predetermined CCE aggregation level. In such an aspect, the PDCCH with the G-RNTI in the UE specific search space is associated with DCI format 1A. In an aspect, the PDCCH with the G-RNTI is sent in a common search space. For example, as discussed supra, the UE-specific search space may be associated with the G-RNTI. For example, as discussed supra, to limit the increase of PDCCH blind decodes, a PDCCH with G-RNTI can be limited to certain CCE aggregation level.

In an aspect, a PDCCH with the G-RNTI in a common search space is associated with DCI format 1A. For example, as discussed supra, by supporting DCI format 1A associated with the PDCCH with G-RNTI in a common search space, without supporting other DCI formats, the number of PDCCH blind decodes may not be increased even when the UE supports concurrent reception of both the C-RNTI based PDSCH and the G-RNTI based PDSCH in the same subframe.

In an aspect, for a downlink transmission mode supported by the UE for the PTM transmission, a new DCI format corresponding to a DCI format supported by the downlink transmission mode is generated and the new DCI format has a size aligned with DCI format 1A. In such an aspect, the new DCI format is received in a common search space. In such an aspect, the new DCI format is received in a UE-specific search space where the UE-specific search space is associated with the G-RNTI. For example, as discussed supra, each DCI format that is transmission mode specific may be modified to be a new DCI format for the PTM transmission, where the size of the new DCI format is aligned with DCI format 1A. For example, as discussed supra, the UE defines that the new DCI format is supported in a common search space. For example, as discussed supra, the UE may define that the new DCI format is supported in a UE-specific search space, where the UE-specific search space is associated with a PDCCH associated with the G-RNTI.

Figure 12:
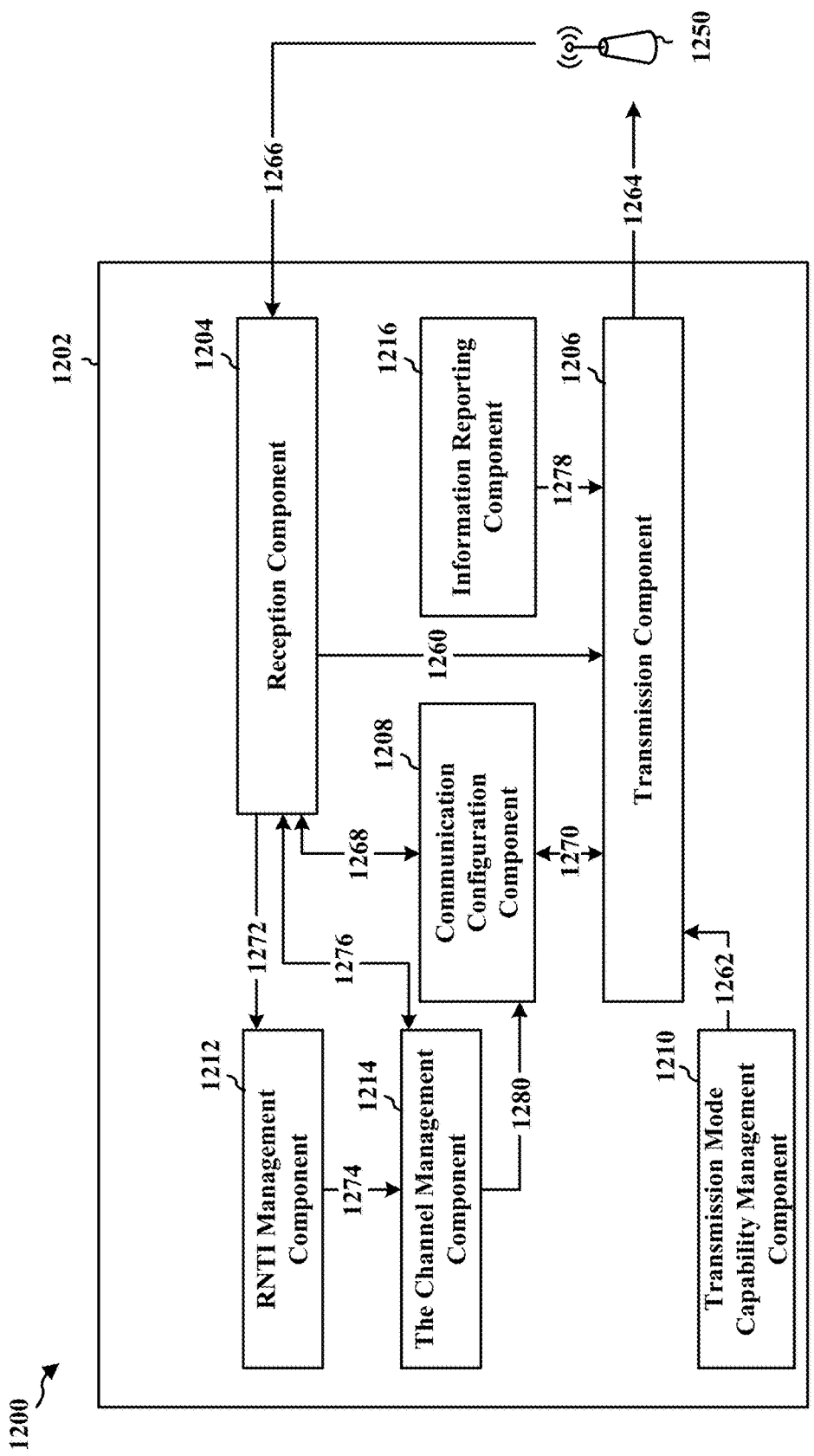
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE. The apparatus includes a reception component 1204, a transmission component 1206, a communication configuration component 1208, a transmission mode capability management component 1210, an RNTI management component 1212, a channel management component 1214, and an information reporting component 1216. The reception component 1204 may be configured to communicate with the transmission component 1206 at 1260.

The transmission mode capability management component 1210 reports via the transmission component 1206 a downlink transmission mode capability of the UE to a network, at 1262 and 1264. In an aspect, the reported downlink transmission mode capability is used to configure the PTM transmission with one of the plurality of downlink transmission modes. In an aspect, the transmission mode capability management component 1210 may report the downlink transmission capability by reporting the downlink transmission mode capability to an AS when the UE initially connects to the AS that is configured to indicate to the eNB 1250 about the downlink transmission mode capability. In another aspect, the transmission mode capability management component 1210 may report the downlink transmission capability by entering a connected mode with a eNB 1250 to report the downlink transmission mode capability to the eNB 1250 when the UE determines to receive the PTM transmission, where the UE enters an idle mode to receive the PTM transmission after reporting the downlink transmission mode.

The communication configuration component 1208 receives via the reception component 1204, from a network (e.g., the eNB 1250), a downlink transmission configuration indicating one of a plurality of downlink transmission modes, at 1266 and 1268. The communication configuration component 1208 configures downlink communication based on the one of the plurality of downlink transmission modes according to the downlink transmission configuration. The reception component 1204 receives a service via PTM transmission based on the one of the plurality of downlink transmission modes that corresponds with the service, at 1266 and 1268. In an aspect, the plurality of downlink transmission modes are transmission modes for a PDSCH. In an aspect, the UE receives the service via the PTM transmission based on a rank for PTM transmission. The communication configuration component 1208 may communicate a communication configuration with the transmission component 1206 at 1270, such that the transmission component 1206 may send data to the eNB 1250, at 1264, based on the communication configuration.

According to the first method, the UE is configured to support reception of either a PDSCH that is based on a C-RNTI or a PDSCH that is based on a G-RNTI in a same subframe. The RNTI management component 1212 receives via the reception component 1204 information about subframes that are available for the G-RNTI to monitor for the G-RNTI, at 1266 and 1272.

In an aspect, the G-RNTI is an SPS G-RNTI. In an aspect, the C-RNTI is an SPS C-RNTI. In an aspect, if the RNTI management component 1212 receives information on the subframes to be monitored for the G-RNTI, the RNTI management component 1212 monitors for at least one of a G-RNTI or an SPS G-RNTI, without monitoring for a C-RNTI or an SPS C-RNTI, and if the RNTI management component 1212 does not receive information on the subframes to be monitored for the G-RNTI, the RNTI management component 1212 monitors for at least one of a G-RNTI or an SPS G-RNTI and for at least one of a C-RNTI or an SPS C-RNTI. In an aspect, if the RNTI management component 1212 detects a PDCCH with at least one of a G-RNTI or an SPS G-RNTI after monitoring for at least one of a G-RNTI or an SPS G-RNTI and for at least one of a C-RNTI or an SPS C-RNTI, the RNTI management component 1212 stops monitoring a PDCCH with a C-RNTI and an SPS C-RNTI in the subframe.

According to the second method, the UE is configured to support concurrent reception of both a PDSCH that is based on a C-RNTI and a PDSCH that is based on a G-RNTI in a same subframe. The channel management component 1214 decodes a PDCCH with both the C-RNTI and the G-RNTI in the same subframe. For example, the channel management component 1214 may receive the C-RNTI and the G-RNTI from the RNTI management component 1212 at 1274, and may receive the PDCCH via the reception component 1204 at 1266 and 1276. The information reporting component 1216 sends an MBMS interest indication message to the eNB 1250 via the transmission component 1206, at 1278 and 1264. The eNB 1250 may configure a unicast data rate associated with C-RNTI based on the MBMS interest indication for the PTM transmission. In an aspect, the unicast data rate associated with the C-RNTI is set to be equal to a highest data rate for the PTM transmission if the MBMS interest indication message does not indicate a service. In an aspect, the G-RNTI is an SPS G-RNTI. In an aspect, the C-RNTI is an SPS C-RNTI. The channel management component 1214 may also communicate with the communication configuration component 1208 at 1280 for communication configuration.

In the second method, the RNTI management component 1212 receives via the reception component 1204 information about subframes that are available for transmission of the PDSCH with the G-RNTI, at 1266 and 1272. The RNTI management component 1212 monitors for a PDCCH with the G-RNTI in the subframes that are available for the G-RNTI. The RNTI management component 1212 UE monitors for a PDCCH with the C-RNTI in all subframes.

In the second method, the RNTI management component 1212 drops a PDCCH associated with the C-RNTI if the RNTI management component 1212 detects a PDCCH with the G-RNTI.

In an aspect, a PDCCH with the G-RNTI is received in a UE-specific search space where the UE-specific search space is associated with the G-RNTI. In such an aspect, in the UE-specific search space, the PDCCH with the G-RNTI is limited to a predetermined CCE aggregation level. In such an aspect, the PDCCH with the G-RNTI in the UE specific search space is associated with DCI format 1A. In an aspect, the PDCCH with the G-RNTI is sent in a common search space. In an aspect, a PDCCH with the G-RNTI in a common search space is associated with DCI format 1A.

In an aspect, for a downlink transmission mode supported by the UE for the PTM transmission, a new DCI format corresponding to a DCI format supported by the downlink transmission mode is generated and the new DCI format has a size aligned with DCI format 1A. In such an aspect, the new DCI format is received in a common search space. In such an aspect, the new DCI format is received in a UE-specific search space where the UE-specific search space is associated with the G-RNTI.

The apparatus may include additional components that perform each of the blocks of the algorithm in the aforementioned flowcharts of FIGS. 9-11. As such, each block in the aforementioned flowcharts of FIGS. 9-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
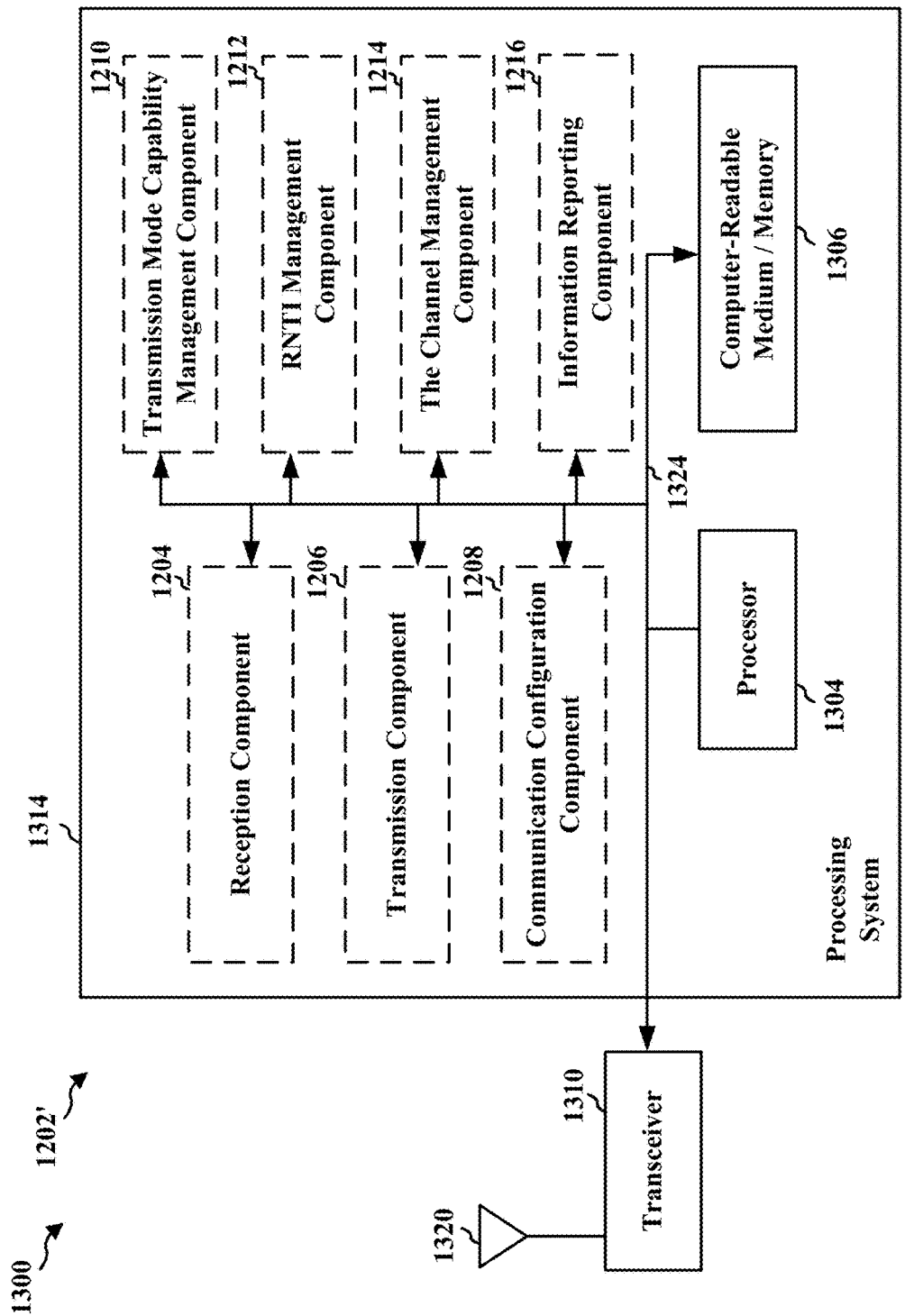
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for receiving, from a network, a downlink transmission configuration indicating one of a plurality of downlink transmission modes, means for configuring downlink communication based on the one of the plurality of downlink transmission modes according to the downlink transmission configuration, and means for receiving a service via PTM transmission based on the one of the plurality of downlink transmission modes that corresponds with the service. The apparatus 1202/1202' further includes means for reporting a downlink transmission mode capability of the UE to a network, where the reported downlink transmission mode capability enables the network to configure the PTM transmission with one of the plurality of downlink transmission modes based on the reported downlink transmission mode capability. The apparatus 1202/1202' further includes means for receiving information about subframes that are available for the G-RNTI to monitor for the G-RNTI. The apparatus 1202/1202' further includes means for decoding a PDCCH with both the C-RNTI and the G-RNTI in the same subframe. The apparatus 1202/1202' further includes means for sending an MBMS interest indication message to a base station. The apparatus 1202/1202' further includes means for receiving information about subframes that are available for transmission of the PDSCH with the G-RNTI, means for monitoring for a PDCCH with the G-RNTI in the subframes that are available for the G-RNTI, and means for monitoring for a PDCCH with the C-RNTI in all subframes. The apparatus 1202/1202' further includes means for dropping a PDCCH associated with the C-RNTI if the UE detects a PDCCH with the G-RNTI.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 14A is a flow chart 1400 of a method of wireless communication, according to an aspect of the disclosure. The method may be performed by an eNB (e.g., the eNB 502 or the eNB 552, the apparatus 1602/1602'). At 1402, the eNB receives a downlink transmission mode capability of the UE from the UE. In an aspect, the downlink transmission mode capability enables the eNB to configure the PTM transmission with one of the plurality of downlink transmission modes based on the received downlink transmission mode capability. For example, as discussed supra, each UE may report a transmission mode capability to the network in order for the eNB to configure the PTM transmission to a respective UE. In an aspect, the eNB receives the downlink transmission mode capability by receiving an indication from an AS about the downlink transmission mode capability, where the downlink transmission mode capability is reported to the AS when the UE initially connects to the AS. For example, as discussed supra, the UEs may report respective transmission mode capabilities to an AS when the UEs are initially set up for the PTM transmission, and the AS informs the eNB about the reported transmission mode capabilities. In another aspect, the eNB receives the downlink transmission mode capability by receiving the downlink transmission mode capability from the UE after the UE enters a connected mode with the eNB when the UE determines to receive the PTM transmission, where the eNB is configured to send the PTM transmission to the UE when the UE enters an idle mode after the eNB receives the downlink transmission mode capability. For example, as discussed supra, when the UE first enters a connected mode with an eNB as the UE prepares to receive a service from the eNB via PTM transmission, the UE may report its transmission mode capability to the eNB. For example, as discussed supra, after reporting the transmission mode capability to the eNB, the UE goes back to an idle mode in order to listen for the PTM transmission and receive a service via PTM transmission.

At 1404, the eNB determines one of a plurality of downlink transmission modes for a service via PTM transmission. At 1406, the eNB transmits a service to a user equipment (UE) via the PTM transmission based on the one of the plurality of downlink transmission modes that corresponds with the service. In an aspect, the plurality of downlink transmission modes are transmission modes for a physical downlink shared channel (PDSCH). Further descriptions with regard to 1408 are provided infra. For example, as discussed supra, the UE may be configured with any one of the downlink transmission modes that is appropriate for receiving a service via PTM transmission.

FIG. 14B is a flow chart 1450 of a method of wireless communication expanding from the flow chart 1400 of FIG. 14A. The method may be performed by the eNB. At 1408, the eNB may continue from 1408 of FIG. 14A. At 1452, the eNB receives a CQI from the UE. At 1454, the eNB determines a rank for the PTM transmission based on the received downlink transmission mode capability and the CQI, wherein the PTM transmission is based on the rank. For example, as discussed supra, the eNB may use a higher rank for PTM transmission based on the transmission mode and CQI feedback from the UE.

FIG. 15A is a flow chart 1500 of a method of wireless communication expanding from the flow chart 1400 of FIG. 14A. The method may be performed by the eNB. At 1408, the eNB may continue from 1408 of FIG. 14A. In the flow chart 1500, the eNB utilizes either a PDSCH that is based on the C-RNTI or a PDSCH that is based on a G-RNTI to communicate with the UE. For example, as discussed supra, the UE may support either a C-RNTI based PDSCH or G-RNTI based PDSCH on the same carrier in the same subframe. At 1502, the eNB sends information on the subframes to be monitored for the G-RNTI to the UE. For example, as discussed supra, the UE is to be signaled (e.g., by the eNB) with information about potential subframes that may be scheduled for G-RNTI, and within those potential subframes, the UE monitors for a G-RNTI and may not monitor for a C-RNTI.

FIG. 15B is a flow chart 1550 of a method of wireless communication expanding from the flow chart 1400 of FIG. 14A. The method may be performed by the eNB. At 1408, the eNB may continue from 1408 of FIG. 14A. In the flow chart 1550, the eNB utilizes both a PDSCH that is based on the C-RNTI and a PDSCH that is based on a G-RNTI to communicate with the UE. For example, as discussed supra, the UE may support concurrent reception of a C-RNTI based PDSCH and a G-RNTI based PDSCH in the same subframe. At 1552, the eNB receives an MBMS interest indication message from the UE. At 1554, the eNB configures a unicast data rate associated with the C-RNTI based on the MBMS interest indication for the PTM transmission. For example, as discussed supra, the UE may send an MBMS interest indication message to the eNB, so that the eNB may configure the PTM transmission based on the MBMS interest indication message. At 1556, the eNB sets the unicast data rate associated with the C-RNTI to be equal to a highest data rate for the PTM transmission if the received MBMS interest indication message does not indicate a service. For example, as discussed supra, the UE does not indicate a specific PTM service (e.g., via the MBMS interest indication message), the eNB may set the data rate for the unicast transmission by considering the highest data rate among the data rates of all possible PTM services based on the MBMS interest indication message.

In an aspect, for a downlink transmission mode supported by the UE for the PTM transmission, a new DCI format corresponding to a DCI format supported by the downlink transmission mode is generated and the new DCI format has a size aligned with DCI format 1A. In such an aspect, the new DCI format is sent in a common search space. In such an aspect, the new DCI format is sent in a UE specific search space where the UE specific search space is associated with G-RNTI. For example, as discussed supra, each DCI format that is transmission mode specific may be modified to be a new DCI format for the PTM transmission, where the size of the new DCI format is aligned with DCI format 1A. The UE defines that the new DCI format is supported in a common search space. For example, as discussed supra, the UE may defines that the new DCI format is supported in a UE-specific search space, where the UE-specific search space is associated with a PDCCH associated with the G-RNTI.

Figure 16:
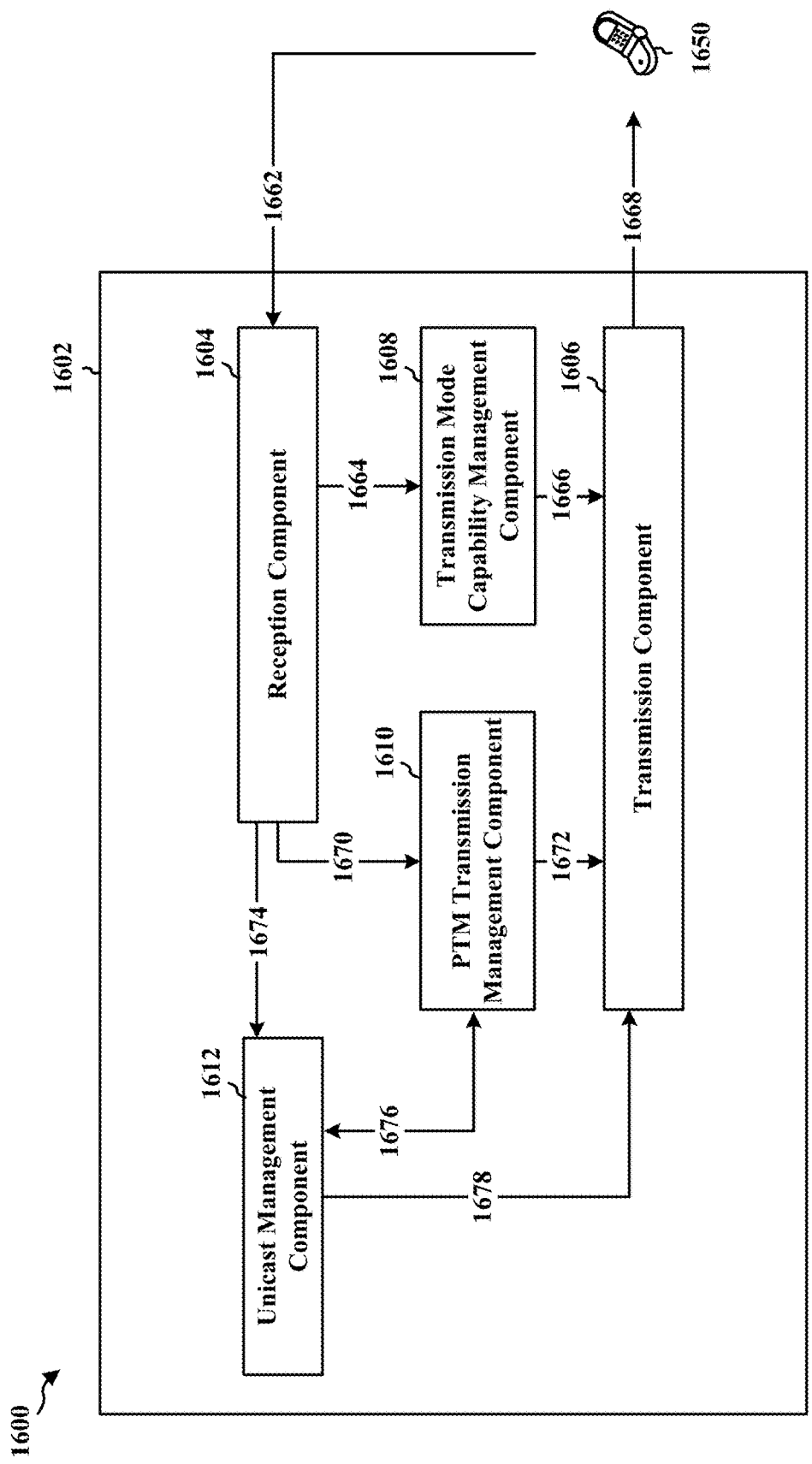
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be an eNB. The apparatus includes a reception component 1604, a transmission component 1606, a transmission mode capability management component 1608, a PTM transmission management component 1610, and unicast management component 1612.

The transmission mode capability management component 1608 receives via the reception component 1604 a downlink transmission mode capability of the UE 1650 from the UE 1650, at 1662 and 1664. In an aspect, the downlink transmission mode capability enables the eNB to configure the PTM transmission with one of the plurality of downlink transmission modes based on the reported downlink transmission mode capability. In an aspect, the eNB (e.g., the transmission mode capability management component 1608) receives the downlink transmission mode capability by receiving an indication from an AS about the downlink transmission mode capability, where the downlink transmission mode capability is reported to the AS when the UE 1650 initially connects to the AS. In another aspect, the eNB (e.g., transmission mode capability management component 1608) receives the downlink transmission mode capability by receiving the downlink transmission mode capability from the UE 1650 after the UE enters a connected mode with the eNB when the UE 1650 determines to receive the PTM transmission, where the eNB is configured to send the PTM transmission to the UE 1650 when the UE 1650 enters an idle mode after the eNB receives the downlink transmission mode capability.

The transmission mode capability management component 1608 determines one of a plurality of downlink transmission modes for a service via PTM transmission. The PTM transmission management component 1610 transmits (e.g., using the transmission component 1606) a service to the UE 1650 via the PTM transmission based on the one of the plurality of downlink transmission modes that corresponds with the service, at 1666 and 1668. In an aspect, the plurality of downlink transmission modes are transmission modes for a PDSCH.

The PTM transmission management component 1610 receives via the reception component 1604 a CQI from the UE 1650, at 1662 and 1670. The PTM transmission management component 1610 determines a rank for the PTM transmission based on the received downlink transmission mode capability and the CQI, where the PTM transmission is based on the rank. The PTM transmission management component 1610 may communicate such information to the transmission component 1606 at 1672, to manage PTM transmissions to the UE 1650.

In the first method, the eNB utilizes either a PDSCH that is based on the C-RNTI or a PDSCH that is based on a G-RNTI in a subframe to communicate with the UE 1650. The eNB sends information on the subframes to be monitored for the G-RNTI to the UE.

In the second method, the eNB utilizes both a PDSCH that is based on the C-RNTI and a PDSCH that is based on a G-RNTI to communicate in a subframe with the UE 1650. The unicast management component 1612 receives an MBMS interest indication message from the UE 1650, at 1662 and 1674. The unicast management component 1612 configures a unicast data rate associated with the C-RNTI based on the MBMS interest indication for the PTM transmission. The unicast management component 1612 sets the unicast data rate associated with the C-RNTI to be equal to a highest data rate for the PTM transmission if the received MBMS interest indication message does not indicate a service. The unicast management component 1612 may communicate with the PTM transmission management component 1610, at 1676, to set the unicast data rate. The unicast management component 1612 may communicate the unicast rate to the transmission component 1606, at 1678, to manage unicast transmission to the UE 1650.

In an aspect, for a downlink transmission mode supported by the UE 1650 for the PTM, a new DCI format corresponding to a DCI format supported by the downlink transmission mode is generated and the new DCI format has a size aligned with DCI format 1A. In such an aspect, the new DCI format is sent in a common search space. In such an aspect, the new DCI format is sent in a UE specific search space where the UE specific search space is associated with G-RNTI.

Figure 14:
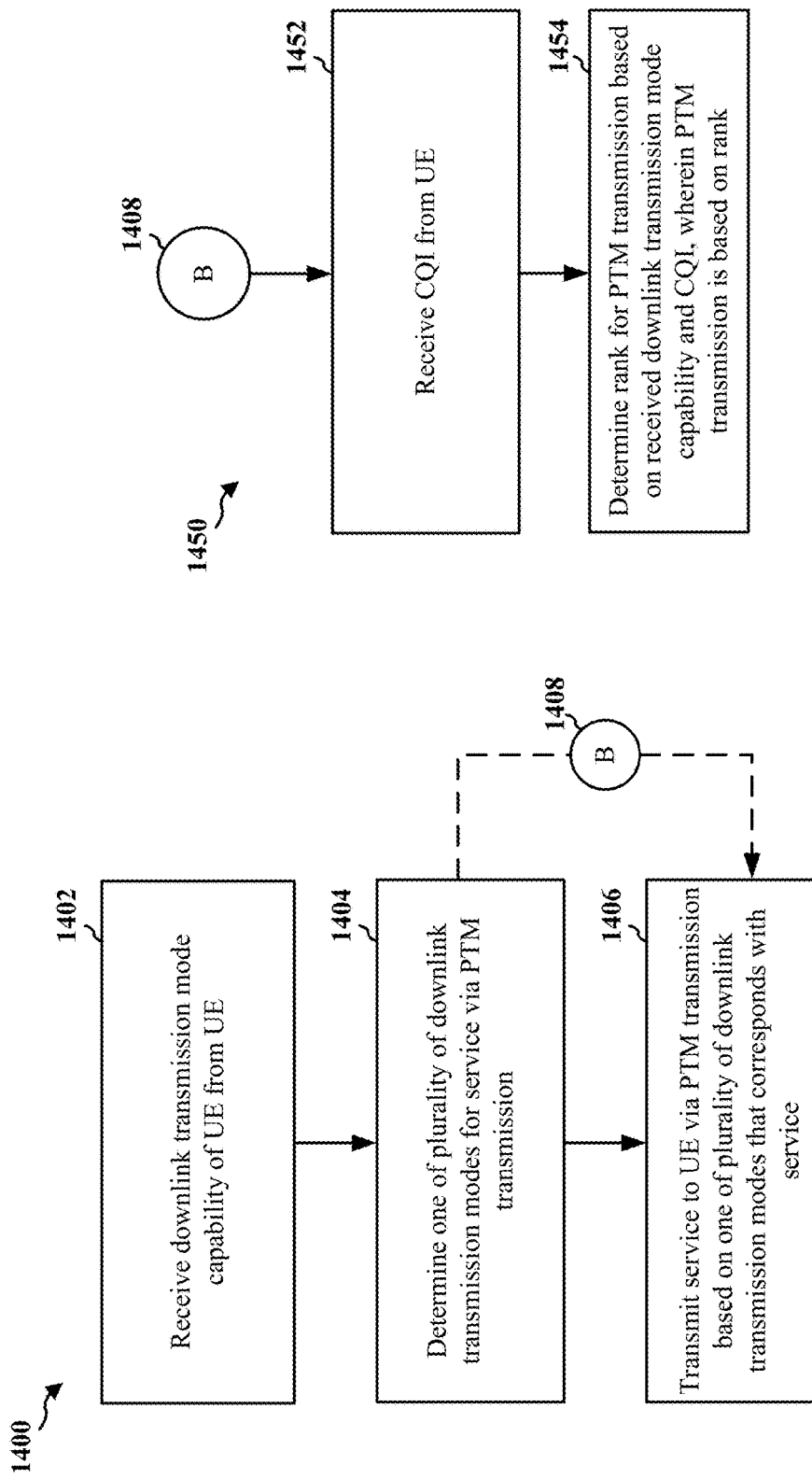
FIG. 14A is a flow chart of a method of wireless communication, according to an aspect of the disclosure.
FIG. 14B is a flow chart of a method of wireless communication expanding from the flow chart of FIG. 14A.
Figure 15:
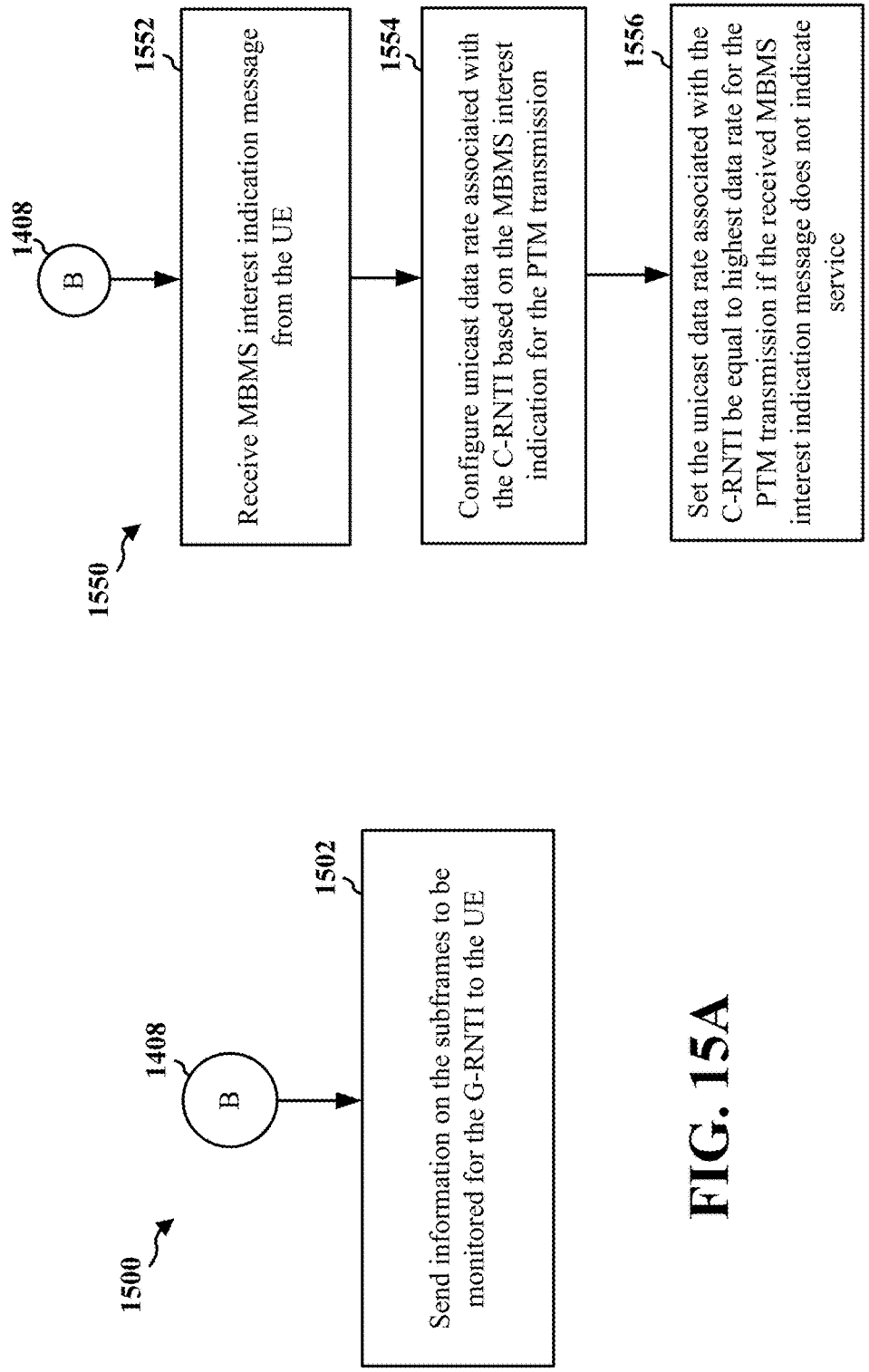
FIG. 15A is a flow chart of a method of wireless communication expanding from the flow chart of FIG. 14A.
FIG. 15B is a flow chart of a method of wireless communication expanding from the flow chart of FIG. 14A.

The apparatus may include additional components that perform each of the blocks of the algorithm in the aforementioned flowcharts of FIGS. 14 and 15. As such, each block in the aforementioned flowcharts of FIGS. 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
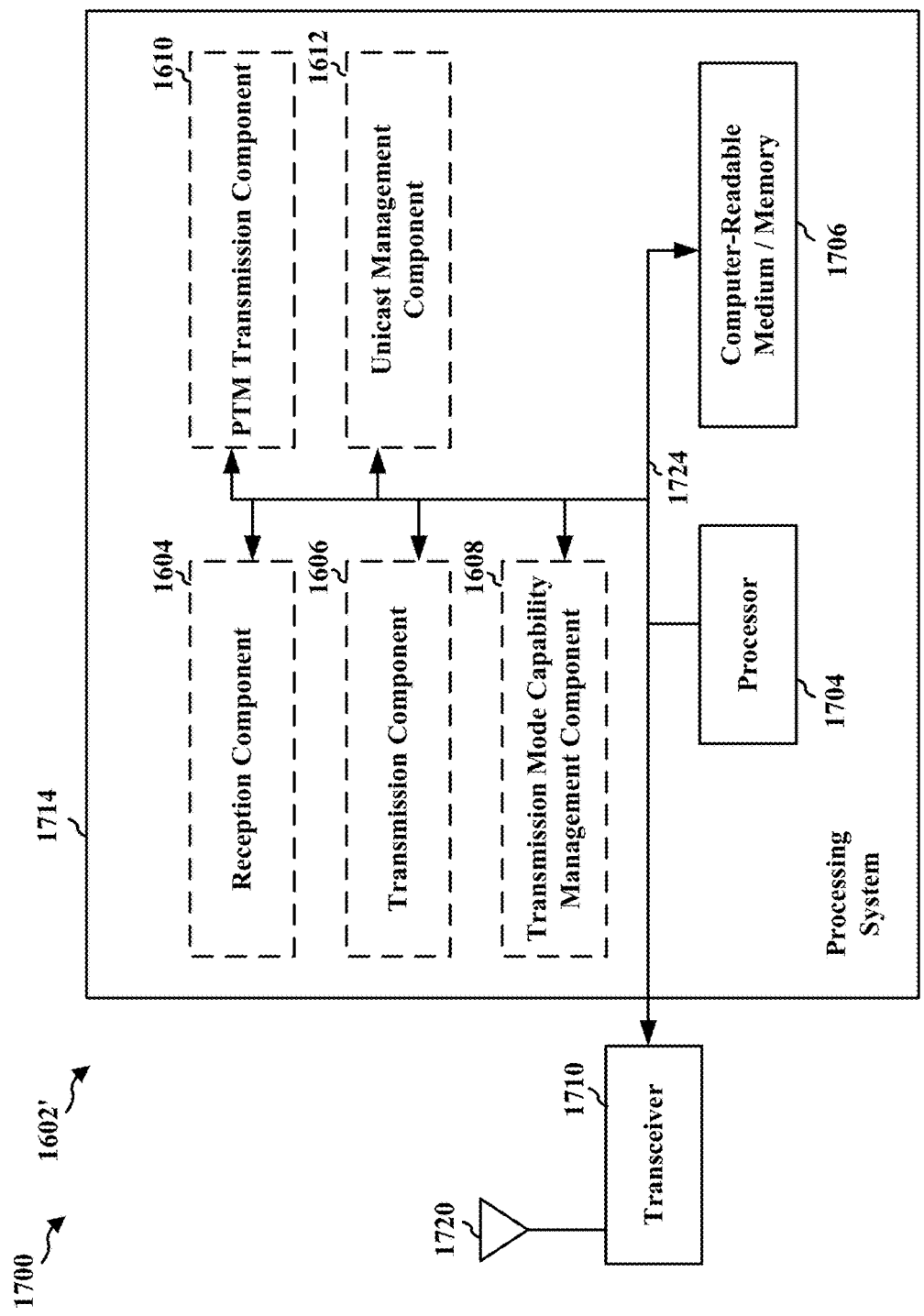
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612. The components may be software components running in the processor 1704, resident/stored in the computer readable medium/memory 1706, one or more hardware components coupled to the processor 1704, or some combination thereof. The processing system 1714 may be a component of the eNB 310 and may include the memory 376 and/or at least one of the TX processor 316, the RX processor 370, and the controller/processor 375.

In one configuration, the apparatus 1602/1602' for wireless communication includes means for determining one of a plurality of downlink transmission modes for a service via PTM transmission, and means for transmitting a service to a UE (e.g., UE 1650) via the PTM transmission based on the one of the plurality of downlink transmission modes that corresponds with the service. The apparatus 1602/1602' further includes means for receiving a downlink transmission mode capability of the UE from the UE, where the downlink transmission mode capability enables the base station to configure the PTM transmission with one of the plurality of downlink transmission modes based on the received downlink transmission mode capability. The apparatus 1602/1602' further includes means for receiving a CQI from the UE, and means for determining a rank for the PTM transmission based on the received downlink transmission mode capability and the CQI, wherein the PTM transmission is based on the rank. The apparatus 1602/1602' further includes means for sending information on the subframes to be monitored for the G-RNTI to the UE. The apparatus 1602/1602' further includes means for receiving an MBMS interest indication message from the UE, and means for configuring a unicast data rate associated with the C-RNTI based on the MBMS interest indication for the PTM transmission. The apparatus 1602/1602' further includes means for setting the unicast data rate associated with the C-RNTI to be equal to a highest data rate for the PTM transmission if the received MBMS interest indication message does not indicate a service.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), comprising:
 receiving, from a network, a downlink transmission configuration indicating a transmit diversity downlink transmission mode of a plurality of downlink transmission modes;
 configuring downlink communication based on the transmit diversity downlink transmission mode according to the downlink transmission configuration; and
 receiving a service via point-to-multiple (PTM) downlink transmission based on the transmit diversity transmission mode, wherein the UE is configured to support concurrent reception of both a physical downlink shared channel (PDSCH) that is based on a cell radio network temporary identifier (C-RNTI) and a physical downlink shared channel (PDSCH) that is based on a group radio network temporary identifier (G-RNTI) in a same subframe.

2. The method of claim 1, wherein a physical downlink control channel (PDCCH) with the G-RNTI in a common search space is associated with downlink control information (DCI) format 1A.

3. The method of claim 1, wherein a physical downlink control channel (PDCCH) with the G-RNTI in a UE-specific search space is associated with downlink control information (DCI) format 1A.

4. A method of wireless communication performed by a user equipment (UE), comprising:
 receiving, from a network, a downlink transmission configuration indicating one of a plurality of downlink transmission modes;
 configuring downlink communication based on the one of the plurality of downlink transmission modes according to the downlink transmission configuration; and
 receiving a service via point-to-multiple (PTM) transmission based on the one of the plurality of downlink transmission modes that corresponds with the service, wherein the UE is configured to support reception of either a physical downlink shared channel (PDSCH) that is based on a cell radio network temporary identifier (C-RNTI) or a PDSCH that is based on a group radio network temporary identifier (G-RNTI) in a same subframe.

5. The method of claim 4, further comprising:
 reporting a downlink transmission mode capability of the UE to a network, wherein the reported downlink transmission mode capability is used to configure the PTM transmission with one of the plurality of downlink transmission modes.

6. The method of claim 5, wherein the reporting the downlink transmission mode capability includes:
 reporting the downlink transmission mode capability to an application server (AS) when the UE initially connects to the AS that is configured to indicate to the network the downlink transmission mode capability.

7. The method of claim 5, wherein the reporting the downlink transmission mode capability includes:
 entering a connected mode with a base station to report the downlink transmission mode capability to the base station when the UE determines to receive the PTM transmission,
 wherein the UE enters an idle mode to receive the PTM transmission after reporting the downlink transmission mode capability.

8. The method of claim 5, wherein the UE receives the service via the PTM transmission based on a rank for PTM transmission.

9. The method of claim 4, further comprising:
 receiving information about subframes that are available for the G-RNTI to monitor for the G-RNTI.

10. The method of claim 4, wherein the G-RNTI is a semi-persistent scheduling (SPS) G-RNTI and the C-RNTI is a semi-persistent scheduling (SPS) C-RNTI.

11. The method of claim 4, wherein if the UE receives information on the subframes to be monitored for the G-RNTI, the UE monitors for at least one of a G-RNTI or a semi-persistent scheduling (SPS) G-RNTI, without monitoring for a C-RNTI or an SPS C-RNTI, and wherein if the UE does not receive information on the subframes to be monitored for the G-RNTI, the UE monitors for at least one of a G-RNTI or an SPS G-RNTI and for at least one of a C-RNTI or an SPS C-RNTI.

12. The method of claim 11, wherein if the UE detects a physical downlink control channel (PDCCH) with at least one of a G-RNTI or an SPS G-RNTI after monitoring for at least one of a G-RNTI or an SPS G-RNTI and for at least one of a C-RNTI or an SPS C-RNTI, the UE stops monitoring a PDCCH with a C-RNTI and an SPS C-RNTI in the subframe.

13. The method of claim 4, wherein the UE is configured to support concurrent reception of both a physical downlink shared channel (PDSCH) that is based on a cell radio network temporary identifier (C-RNTI) and a PDSCH that is based on a group radio network temporary identifier (G-RNTI) in a same subframe.

14. The method of claim 13, further comprising:
 decoding a physical downlink control channel (PDCCH) with both the C-RNTI and the G-RNTI in the same subframe.

15. The method of claim 13, further comprising:
 sending a multimedia broadcast multicast services (MBMS) interest indication message to a base station.

16. The method of claim 13, further comprising:
 receiving information about subframes that are available for transmission of the PDSCH with the G-RNTI;
 monitoring for a physical downlink control channel (PDCCH) with the G-RNTI in the subframes that are available for the G-RNTI; and
 monitoring for a PDCCH with the C-RNTI in all subframes.

17. The method of claim 13, wherein the G-RNTI is a semi-persistent scheduling (SPS) G-RNTI and the C-RNTI is a semi-persistent scheduling (SPS) C-RNTI.

18. The method of claim 13, further comprising:
 dropping a physical downlink control channel (PDCCH) associated with the C-RNTI if the UE detects a PDCCH with the G-RNTI.

19. The method of claim 13, wherein a physical downlink control channel (PDCCH) with the G-RNTI is received in a UE-specific search space where the UE-specific search space is associated with the G-RNTI.

20. The method of claim 19, wherein, in the UE-specific search space, the PDCCH with the G-RNTI is limited to a predetermined control channel element (CCE) aggregation level.

21. The method of claim 19, wherein the PDCCH with the G-RNTI in the UE-specific search space is associated with downlink control information (DCI) format 1A.

22. The method of claim 13, wherein the PDCCH with the G-RNTI is received in a common search space.

23. The method of claim 13, wherein a physical downlink control channel (PDCCH) with the G-RNTI in a common search space is associated with downlink control information (DCI) format 1A.

24. The method of claim 13, wherein for a downlink transmission mode supported by the UE for the PTM transmission, a new downlink control information (DCI) format corresponding to a DCI format supported by the downlink transmission mode is generated and the new DCI format has a size aligned with DCI format 1A.

25. The method of claim 24, wherein the new DCI format is received in a common search space.

26. The method of claim 24, wherein the new DCI format is received in a UE-specific search space where the UE-specific search space is associated with the G-RNTI.

27. A method of wireless communication performed by a base station, comprising:
   determining one of a plurality of downlink transmission modes for a service via point-to-multiple (PTM) transmission; and
   transmitting a service to a user equipment (UE) via the PTM transmission based on the one of the plurality of downlink transmission modes that corresponds with the service, wherein transmitting the service to the UE includes transmitting a physical downlink shared channel (PDSCH) based on a cell radio network temporary identifier (C-RNTI) or a PDSCH based on a group radio network temporary identifier (G-RNTI) in a same subframe.

28. A user equipment (UE) for wireless communication, comprising:
   a memory; and
   at least one processor coupled to the memory and configured to:
      receive, from a network, a downlink transmission configuration indicating a transmit diversity downlink transmission mode of a plurality of downlink transmission modes;
      configure downlink communication based on the transmit diversity downlink transmission mode according to the downlink transmission configuration; and
      receive a service via point-to-multiple (PTM) downlink transmission based on the transmit diversity transmission mode, wherein the UE is configured to support reception of either a physical downlink shared channel (PDSCH) that is based on a cell radio network temporary identifier (C-RNTI) or a PDSCH that is based on a group radio network temporary identifier (G-RNTI) in a same subframe.

* * * * *